(12) United States Patent
Wong et al.

(10) Patent No.: US 10,768,901 B2
(45) Date of Patent: Sep. 8, 2020

(54) CONVERTING CODE OF A FIRST CODE TYPE ON A MAINFRAME DEVICE IN PHASES TO CODE OF A SECOND CODE TYPE

(71) Applicant: Accenture Global Solutions Limited, Dublin (IE)

(72) Inventors: Desmond Y M Wong, Singapore (SG); Daxi Tang, Singapore (SG); Prashanth F. Martin, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 86 days.

(21) Appl. No.: 16/249,536

(22) Filed: Jan. 16, 2019

(65) Prior Publication Data

US 2020/0225915 A1 Jul. 16, 2020

(51) Int. Cl.
| | |
|---|---|
| *G06F 9/44* | (2018.01) |
| *G06F 8/30* | (2018.01) |
| *G06F 8/51* | (2018.01) |
| *G06N 20/10* | (2019.01) |
| *G06N 3/08* | (2006.01) |

(52) U.S. Cl.
CPC ............. *G06F 8/311* (2013.01); *G06F 8/51* (2013.01); *G06N 3/08* (2013.01); *G06N 20/10* (2019.01)

(58) Field of Classification Search
CPC .......... G06F 8/311; G06F 8/51; G06N 20/10; G06N 3/08
USPC .................................................. 717/122, 137
See application file for complete search history.

(56) References Cited

U.S. PATENT DOCUMENTS 6,782,540 B1 8/2004 Chow et al.
2005/0091576 A1* 4/2005 Relyea .................... G06F 9/451
715/211

* cited by examiner

*Primary Examiner* — Chuck O Kendall
(74) *Attorney, Agent, or Firm* — Harrity & Harrity, LLP

(57) ABSTRACT

A device receives a first request indicating that a first portion of code of a first code type is to be converted to a first portion of code of a second code type. The device consolidates data structure access to a single point to retrieve rules associated with relevant data for further processing of the first request and accesses, from the data structure, the rules associated with the relevant data. The device validates the rules associated with the relevant data and the first request and performs, based on validating the rules, calculations associated with the relevant data and the first request to generate results. The device updates the results of the calculations associated with the relevant data and the first request to generate the first portion of code of the second code type and provides the first portion of code of the second code type.

20 Claims, 18 Drawing Sheets

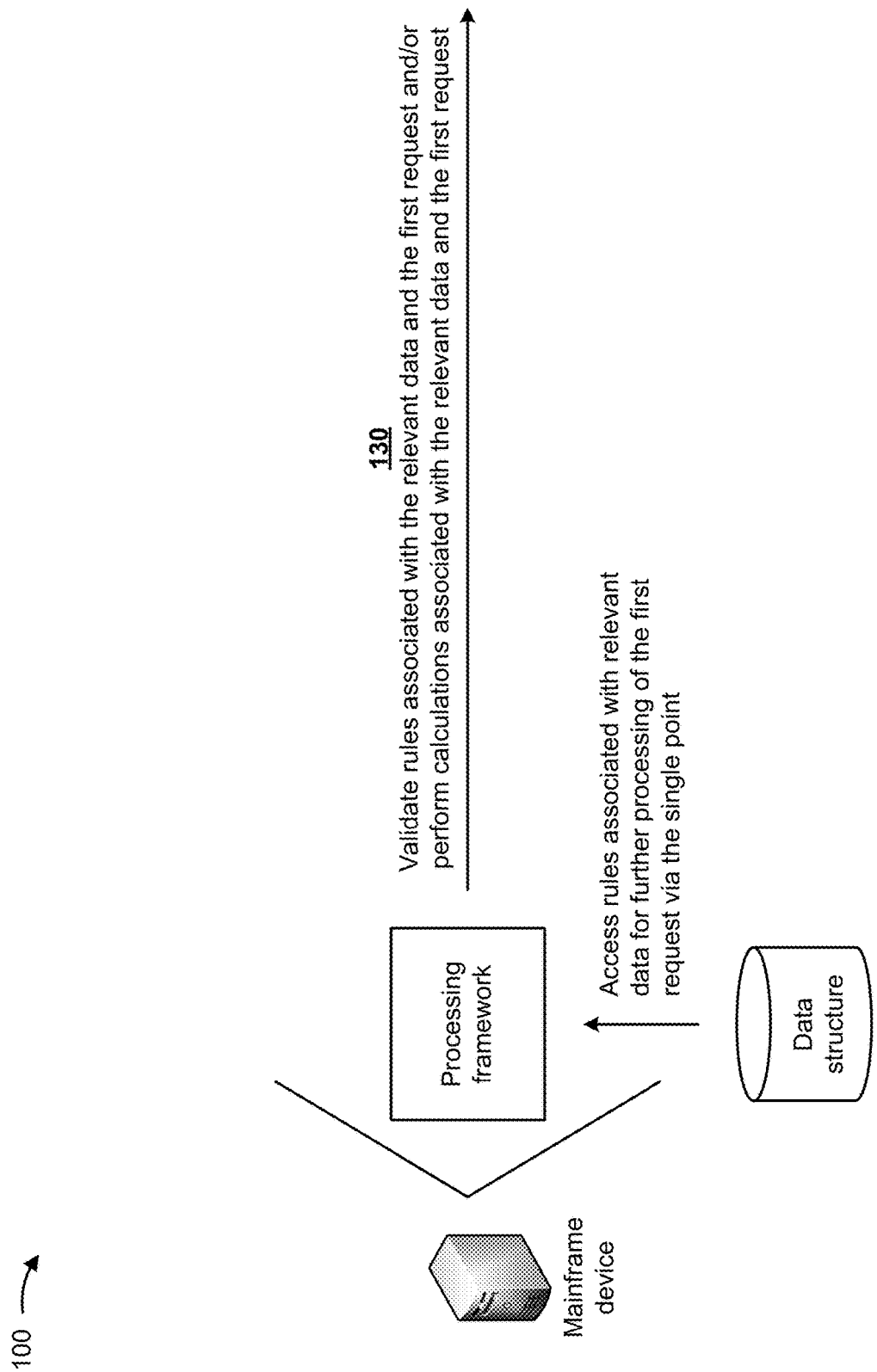

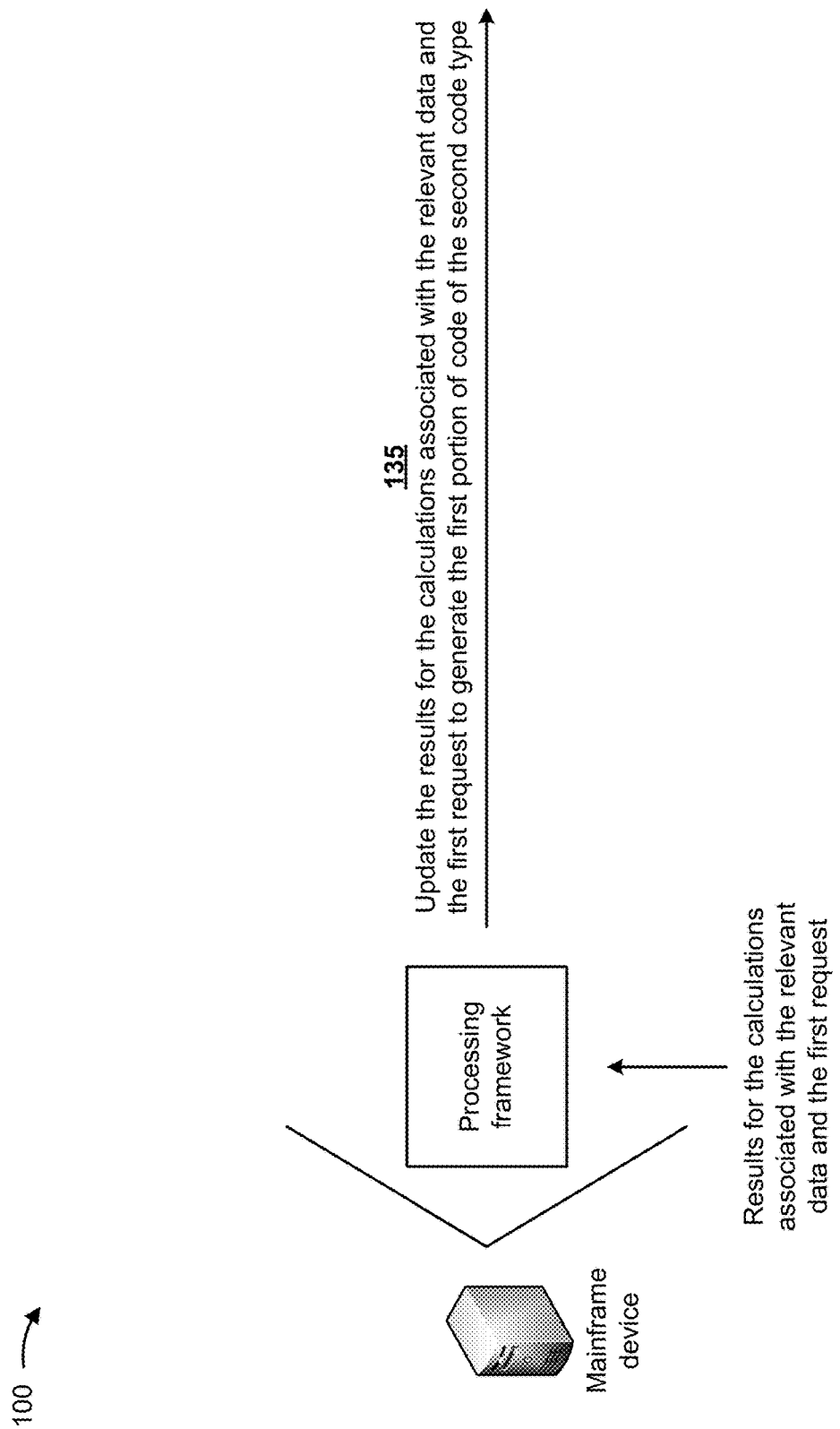

CONVERTING CODE OF A FIRST CODE TYPE ON A MAINFRAME DEVICE IN PHASES TO CODE OF A SECOND CODE TYPE

BACKGROUND

Mainframe devices are computers used primarily by large organizations for critical applications, bulk data processing, enterprise resource planning, transaction processing, and/or the like. Mainframe devices are being phased out by large organizations and being replaced with distributed devices, cloud computing platforms, and/or the like.

SUMMARY

According to some implementations, a method may include receiving, by a mainframe device and from a device, a first request, wherein the first request may indicate that a first portion of code of a first code type, provided on the mainframe device, is to be converted to a first portion of code of a second code type, and wherein the second code type may be different than the first code type. The method may include consolidating data structure access to a single point to retrieve rules associated with relevant data for further processing of the first request and accessing, from the data structure via the single point, the rules associated with the relevant data. The method may include validating the rules associated with the relevant data and the first request and performing, based on validating the rules, calculations associated with the relevant data and the first request to generate results. The method may include updating the results of the calculations associated with the relevant data and the first request to generate the first portion of code of the second code type and providing, to the device, the first portion of code of the second code type to cause the device to perform one or more actions.

According to some implementations, a device may include one or more memories, and one or more processors, communicatively coupled to the one or more memories, to receive information indicating code of a second code type to convert in phases to code of a first code type for execution on a mainframe device, wherein the first code type may be different than the second code type. The one or more processors may determine portions of the code of the second code type to convert in phases to the code of the first code type and may deconstruct a first portion of code of the second code type to generate a report indicating logical sections of the first portion of code of the second code type. The one or more processors may generate a wrapper for the first portion of code of the second code type, based on the logical sections, and may generate a first portion of code of the first code type based on the wrapper for the first portion of code of the second code type. The one or more processors may perform one or more actions based on the first portion of code of the first code type.

According to some implementations, a non-transitory computer-readable medium may store instructions that include one or more instructions that, when executed by one or more processors of a mainframe device, cause the one or more processors to provide, to a client device, information indicating code of a first code type on the mainframe device and receive, from a device, a first request, wherein the first request may indicate that a first portion of code of the first code type, provided on the mainframe device, is to be converted to a first portion of code of a second code type, wherein the second code type may be different than the first code type, and wherein the first request may be received based on providing, to the client device, the information indicating the code of the first code type on the mainframe device. The one or more instructions may cause the one or more processors to consolidate data structure access to a single point to retrieve rules associated with relevant data for further processing of the first request and access, from the data structure via the single point, the rules associated with the relevant data. The one or more instructions may cause the one or more processors to validate the rules associated with the relevant data and the first request and perform, based on validating the rules, calculations associated with the relevant data and the first request to generate results. The one or more instructions may cause the one or more processors to update the results of the calculations associated with the relevant data and the first request to generate the first portion of code of the second code type and provide, to the device, the first portion of code of the second code type to cause the device to perform one or more actions.

BRIEF DESCRIPTION OF THE DRAWINGS

FIGS. 1A-1M are diagrams of an example implementation described herein.

DETAILED DESCRIPTION

Figure 1A:
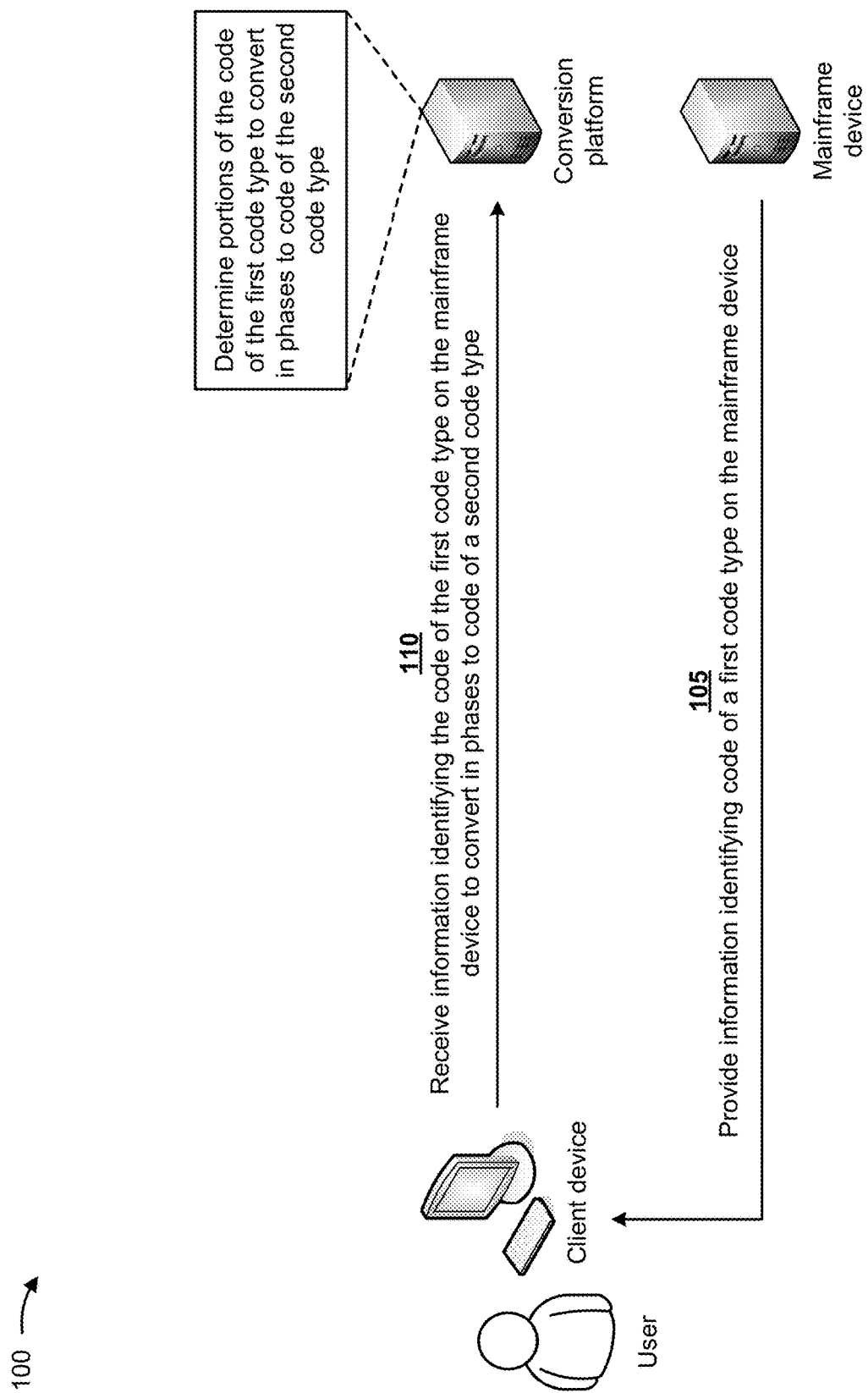

The following detailed description of example implementations refers to the accompanying drawings. The same reference numbers in different drawings may identify the same or similar elements.

Many entities have developed application systems on old technology platforms (e.g., mainframe devices) such that the application systems are large and monolithic. Making changes to such application systems to meet new business needs is difficult and risky. For example, mainframe devices typically utilize code of a first code type (e.g., a common business-oriented language (COBOL) code type) that may need to be converted to code of a second code type (e.g., a Java code type), in order to achieve increased efficiency and/or other advantages of the second code type. Converting the code of the first code type to the code of the second code type may include converting the entire code of the first code type to the code of the second code type. However, converting the entire code of the first code type to the code of the second code type creates a technical problem of generating coding errors (e.g., that need to be corrected) that cause the code to be unavailable to the large organization for extended periods of time.

Some implementations described herein provide a conversion platform and/or a mainframe device that converts code of a first code type on the mainframe device in phases to code of a second code type. Converting the code in phases prevents or minimizes generation of coding errors that cause the code to be unavailable for extended periods of time. For example, the conversion platform may receive information indicating code of a first code type to convert in phases to code of a second code type for execution on a mainframe device, wherein the first code type may be different than the second code type. The conversion platform may determine portions of the code of the first code type to convert in phases to the code of the second code type and may deconstruct a first portion of code of the first code type to generate a report indicating logical sections of the first portion of code of the first code type. The conversion platform may generate a wrapper for the first portion of code of the first code type, based on the logical sections, and may generate a first portion of code of the second code type based on the wrapper for the first portion of code of the first code type. The conversion platform may perform one or more actions based on the first portion of code of the second code type.

In this way, code of a first code type (e.g., a COBOL code type), provided on a mainframe device, is converted in phases to code of a second code type (e.g., a Java code type) before the mainframe device is taken offline. Converting the code of the first code type in phases to the code of the second code type prevents the technical problem of generating coding errors that cause the code to be unavailable for extended periods of time, and conserves resources (e.g., processing resources, memory resources, and/or the like) that would otherwise be wasted in correcting such coding errors.

FIGS. 1A-1M are diagrams of an example implementation 100 described herein. As shown in FIG. 1A, a client device may be associated with a user, a conversion platform, and a mainframe device. In some implementations, the mainframe device may be associated with an entity (e.g., a corporation, a business unit of a corporation, a department of a corporation or a business unit, a government agency, a branch of a government agency, and/or the like) that wishes to replace the mainframe device with distributed devices, a cloud computing platform, and/or the like. In some implementations, the mainframe device may include code of a first code type (e.g., a COBOL code type) that needs to be converted to code of second code type (e.g., a Java code type) before the mainframe device is replaced. In such implementations, the user may cause the client device to request, from the mainframe device, information identifying the code of the first code type provided on the mainframe device.

Although implementations are described herein with respect to the mainframe device, in some implementations, the mainframe device may be replaced with another technology platform, such as a cloud computing environment, distributed server devices, and/or the like.

As further shown in FIG. 1A, and by reference number 105, the mainframe device may provide, to the client device, the information identifying the code of the first code type provided on the mainframe device. In some implementations, the information identifying the code of the first code type may include the code of the first code type; information identifying sections of the code of the first code type (e.g., logical subdivisions of program logic), paragraphs of the code of the first code type (e.g., subdivisions of the sections), sentences of the code of the first code type (e.g., combinations of one or more statements), statements of the code of the first code type (e.g., statements that perform some processing), and/or the like. In some implementations, the user may cause the client device to provide, to the conversion platform, the information identifying the code of the first code type and an instruction to convert the code of the first code type to code of a second code type.

As further shown in FIG. 1A, and by reference number 110, the conversion platform may receive, from the client device, the information identifying the code of the first code type and the instruction to convert the code of the first code type to code of a second code type. In some implementations, the conversion platform may store the information identifying the code of the first code type in a data structure (e.g., a database, a table, a list, and/or the like) so that the conversion platform may utilize such information later.

As further shown in FIG. 1A, the conversion platform may determine portions of the code of the first code type to convert in phases to the code of the second code type based on the information identifying the code of the first code type. In some implementations, the portions of the code the first code type may include one or more sections, paragraphs, sentences, statements, and/or the like of the code of the first code type. In some implementations, the mainframe device may convert the portions of the code of the first code type in phases to prevent coding errors (e.g., a need to correct such coding errors) associated with converting the entire code of the first code type. In this way, the mainframe device conserves resources (e.g., processing resources, memory resources, and/or the like) that would otherwise be wasted in correcting such coding errors.

Figure 1B:
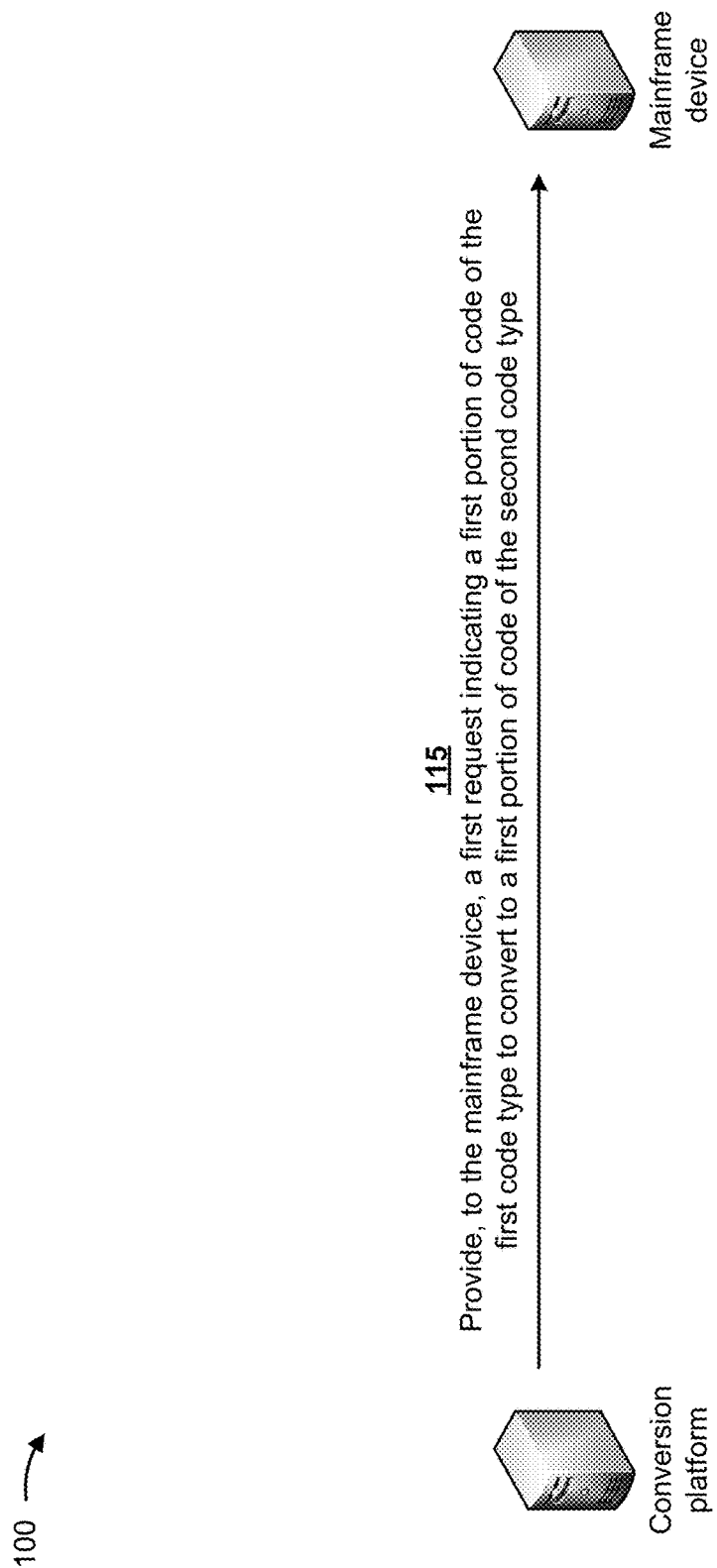

As shown in FIG. 1B, and by reference number 115, the conversion platform may provide, to the mainframe device, a first request indicating a first portion of code of the first code type to convert to a first portion of code of the second code type. For example, if particular sections of the code of the first code type perform a particular function on the mainframe device, the conversion platform may determine the particular sections of the code of the first code type to be the first portion of code of the first code type. In such an example, the conversion platform may provide, to the mainframe device, information identifying the particular sections of the code of the first code type and a request to convert the particular sections to a portion of code of the second code type (e.g., Java code that performs the particular function).

Figure 1C:
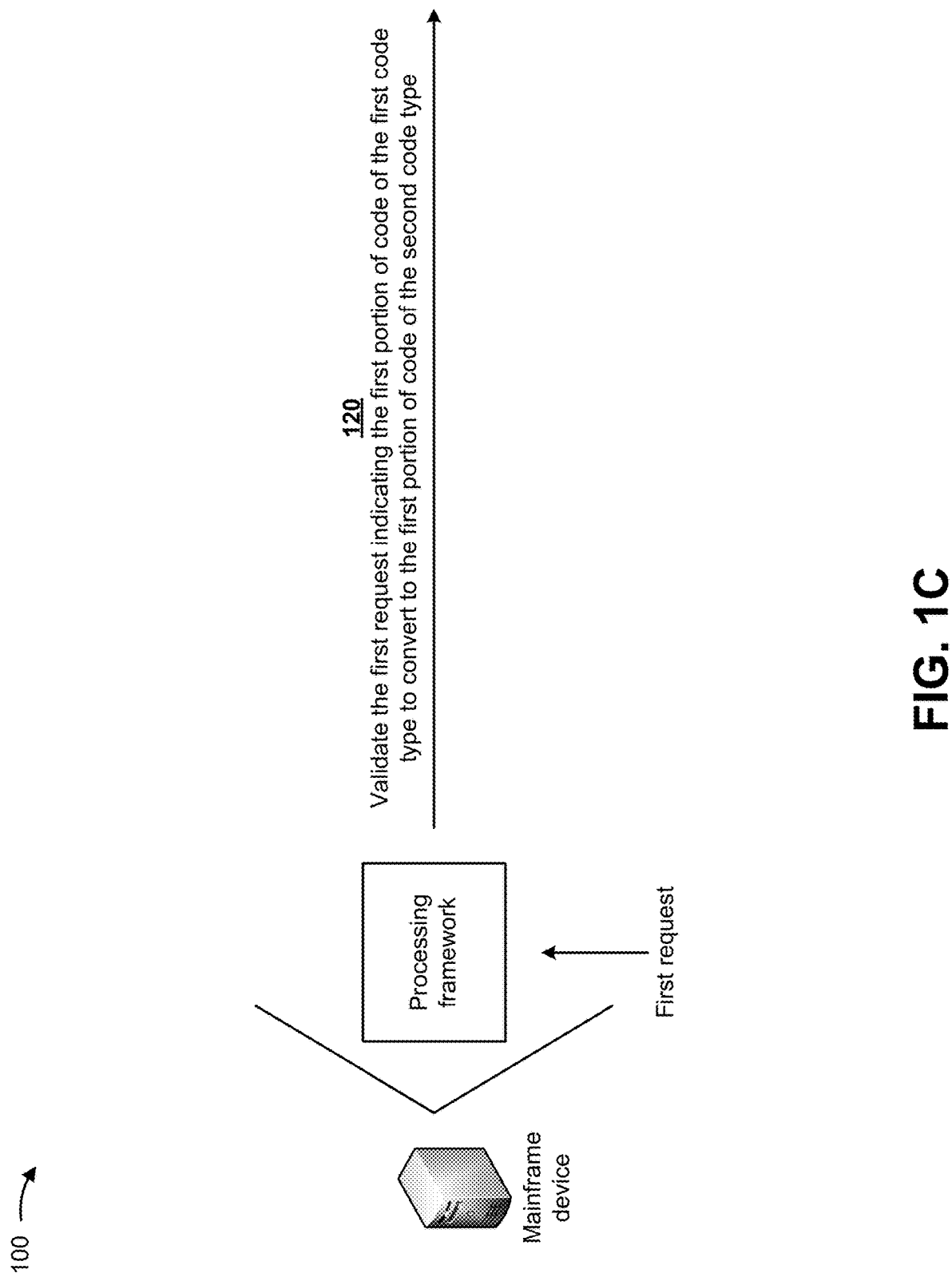

As shown in FIG. 1C, and by reference number 120, the mainframe device may validate the first request indicating the first portion of code of the first code type to convert to the first portion of code of the second code type. In some implementations, the mainframe device may validate the first portion of code of the first code type based on whether the first portion of code of the first code type is capable of being converted to the first portion of code of the second code type. In such implementations, the mainframe device may determine whether a particular function performed by the first portion of code of the first code type is capable of being performed with code of the second code type. If the particular function is capable of being performed with code of the second code type, the mainframe device may validate the first request. Otherwise, the mainframe device may not validate the first request and may provide a message, to the client device, indicating that the first portion of code of the first code type is incapable of being converted to the first portion of code of the second code type.

In some implementations, the mainframe device may validate the first portion of code of the first code type based on whether data entries (e.g., statements, characters, and/or the like), referenced in the first portion of code of the first code type, exist. For example, if the first portion of code of the first code type references an account number and the account number exists, the mainframe device may validate the first request. Otherwise, the mainframe device may not validate the first request and may provide a message, to the client device, indicating that the first portion of code of the first code type references in a non-existent account number.

Figure 1D:
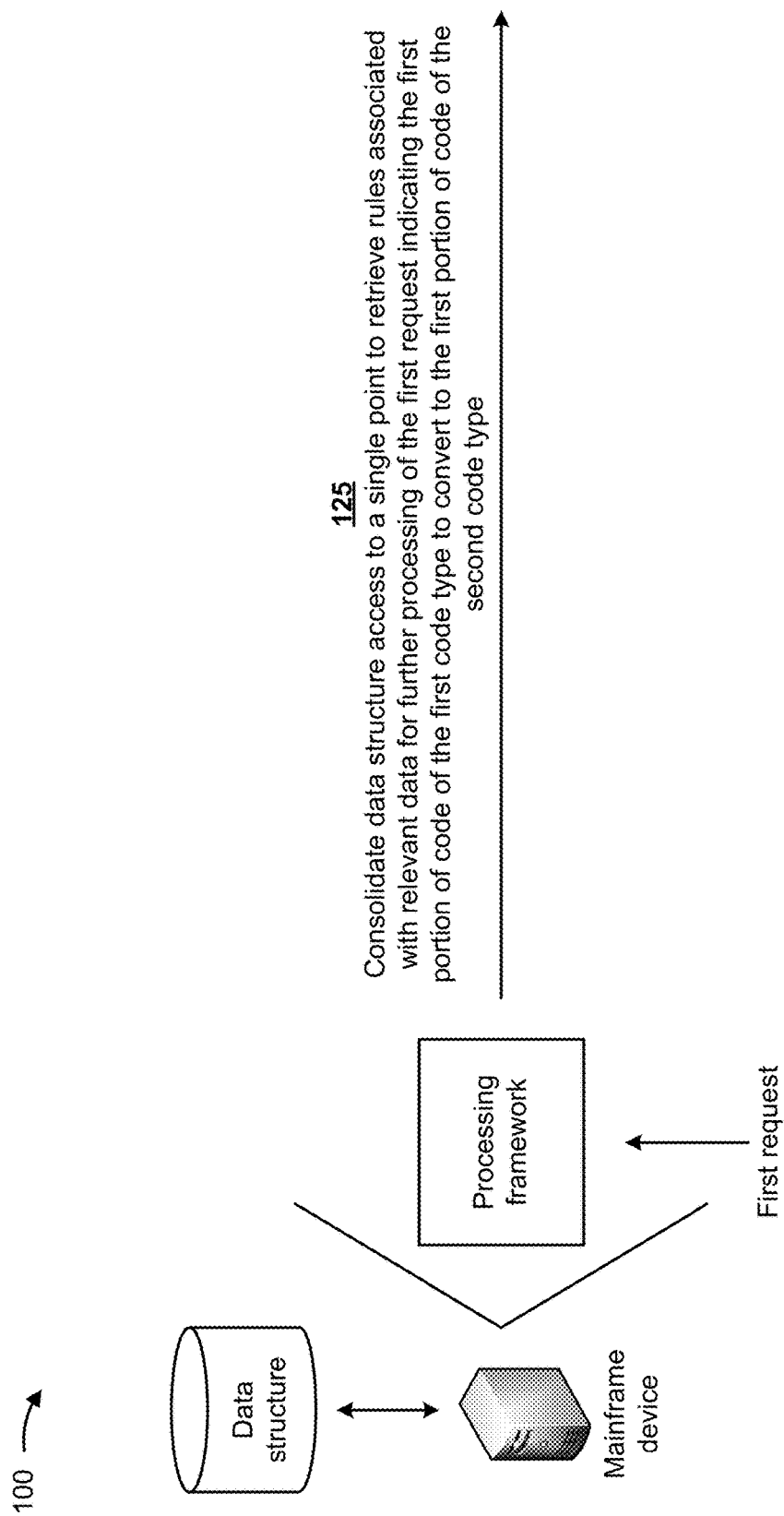

As shown in FIG. 1D, and by reference number 125, the mainframe device may consolidate data structure access (e.g., by the mainframe device) to a single point to retrieve rules associated with relevant data for further processing of the first request indicating the first portion of code of the first code type to convert to the first portion of code of the second code type. In some implementations, the mainframe device may be associated with a data structure that includes rules with relevant data for further processing the first request. In some implementations, the mainframe device may access a point in the data structure where the rules with relevant data are referenced and/or stored. In some implementations, the rules may include data that may be used to further process the first portion of code of the first code type so that the first portion of code of the first code type may be converted to the first portion of code of the second code type. For example, if the first portion of code of the first code type relates to performing a transaction associated with an account, the rules may include account information associated with the account and which may be used to perform calculations for the transaction.

As shown in FIG. 1E, the mainframe device may access, via the single point access of the data structure, the rules associated with the relevant data for further processing of the first request. In some implementations, the mainframe device may request the rules associated with the relevant data from the data structure, and the data structure may provide the rules associated with the relevant data to the mainframe device. As further shown in FIG. 1E, and by reference number 130, the mainframe device may validate the rules associated with the relevant data and the first request and/or may perform one or more calculations associated with the relevant data and the first request.

In some implementations, the mainframe device may validate the rules associated with the relevant data and the first request based on whether the first portion of code of the first code type is capable of utilizing the rules associated with the relevant data to perform a function associated with the first portion of code of the first code type. In such implementations, the mainframe device may determine whether a particular function of the first portion of code of the first code type is capable of being performed with the rules associated with the relevant data. If the particular function is capable of being performed with the rules associated with the relevant data, the mainframe device may validate the rules associated with the relevant data. Otherwise, the mainframe device may not validate the rules associated with the relevant data and may provide a message, to the client device, indicating that the rules associated with the relevant data are invalid for the particular function.

If the mainframe device validates the rules associated with the relevant data, the mainframe device may perform one or more calculations associated with the relevant data and the first request. For example, if the first portion of code of the first code type relates to performing a transaction associated with an available tax relief for an account (e.g., a retirement account), the rules may include account information associated with the account and information indicating an amount of cash deposited into the account. The mainframe device may utilize such rules to perform the available tax relief calculations for the account. In some implementations, the calculations associated with the relevant data and the first request may generate results for the calculations associated with the relevant data and the first request. For example, the results of the available tax relief calculations described above may include one or more numbers indicating the available tax relief for the account.

As shown in FIG. 1F, and by reference number 135, the mainframe device may update the results for the calculations associated with the relevant data and the first request to generate the first portion of code of the second code type. In some implementations, the mainframe device may verify that the results for the calculations associated with the relevant data and the first request are correct. For example, the mainframe device may verify that the one or more numbers indicating the available tax relief for the account, based on the available tax relief calculations described above, are correct. In some implementations, if the results for the calculations associated with the relevant data and the first request are incorrect, the mainframe device may modify the first portion of code of the first code type and reperform the one or more calculations associated with the relevant data and the first request until the results are correct. In some implementations, once the results for the calculations associated with the relevant data and the first request are verified to be correct, the mainframe device may generate the first portion of code of the second code type based on the first portion of code of the first code type (e.g., modified as necessary).

Figure 1G:
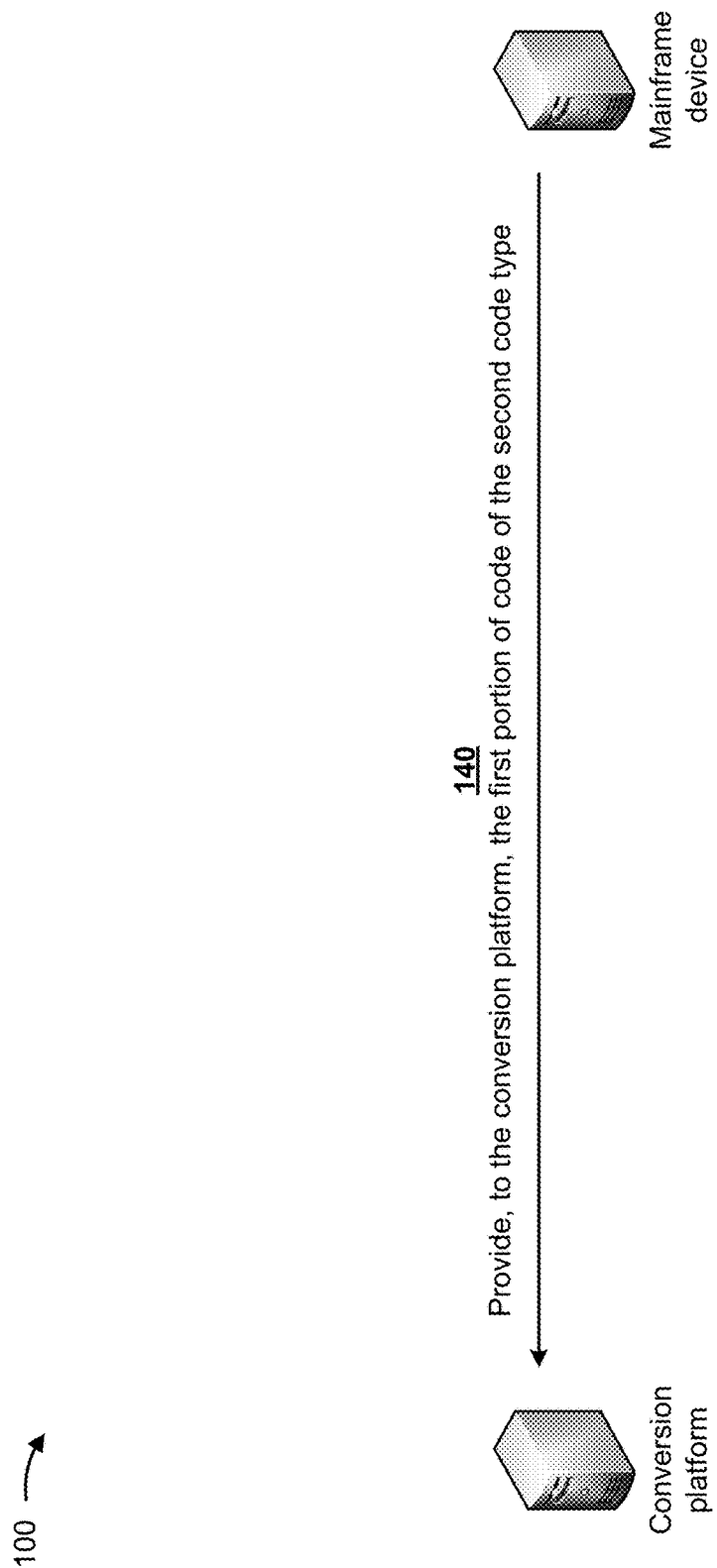

As shown in FIG. 1G, and by reference number 140, the mainframe device may provide, to the conversion platform, the first portion of code of the second code type. In some implementations, the conversion platform may receive the first portion of code of the second code type and may store the first portion of code of the second code type in a data structure (e.g., a database, a table, a list, and/or the like) associated with the conversion platform.

Figure 1H:
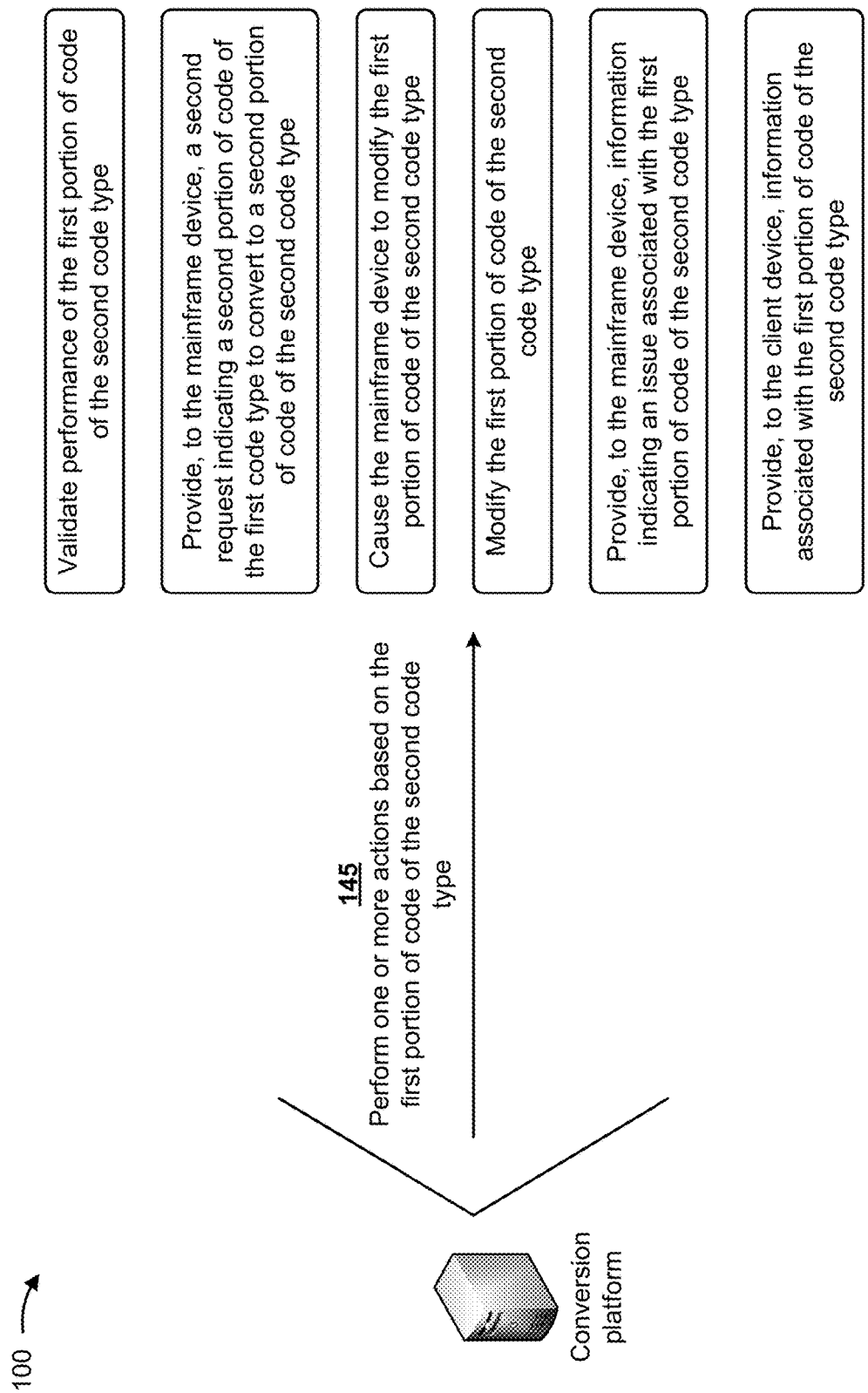

As shown in FIG. 1H, and by reference number 145, the conversion platform may perform one or more actions based on the first portion of code of the second code type. In some implementations, the one or more actions may include validating performance of the first portion of code of the second code type. For example, the conversion platform may execute the first portion of code of the second code type and may validate results of executing the first portion of code of the second code type. In this way, the conversion platform may validate that the first portion of code of the second code type executes correctly.

In some implementations, the one or more actions may include providing, to the mainframe device, a second request indicating a second portion of code of the first code type to convert to a second portion of code of the second code type. In this way, the conversion platform may convert the code of the first code type in phases to code of the second code type before the mainframe device is taken offline.

In some implementations, the one or more actions may include causing the mainframe device to modify the first portion of code of the second code type. For example, the conversion platform may determine that the first portion of code of the second code type needs a modification to function correctly and may instruct the mainframe device to modify the first portion of code of the second code type accordingly. In this way, the conversion platform may ensure that the first portion of code of the second code type functions correctly.

In some implementations, the one or more actions may include modifying the first portion of code of the second code type. For example, the conversion platform may determine that the first portion of code of the second code type needs a modification to function correctly and may modify the first portion of code of the second code type accordingly. In this way, the conversion platform may ensure that the first portion of code of the second code type functions correctly.

In some implementations, the one or more actions may include providing, to the mainframe device, information indicating an issue associated with the first portion of code of the second code type. For example, the conversion platform may determine that the first portion of code of the second code type generates an error during execution and may inform the mainframe device about the error generated during execution of the first portion of code of the second code type. In this way, the conversion platform may cause the mainframe device to correct the error generated by the first portion of code of the second code type before moving to a next phase of the code conversion.

In some implementations, the one or more actions may include providing, to the client device, information associated with the first portion of code of the second code type. For example, the conversion platform may provide, to the client device, a user interface that includes the first portion of code of the second code type, errors experienced during execution of the first portion of code of the second code type, and/or the like. In this way, the conversion platform may enable the user of the client device to view the first portion of code of the second code type, correct the errors experienced during execution of the first portion of code of the second code type, and/or the like.

Figure 1I:
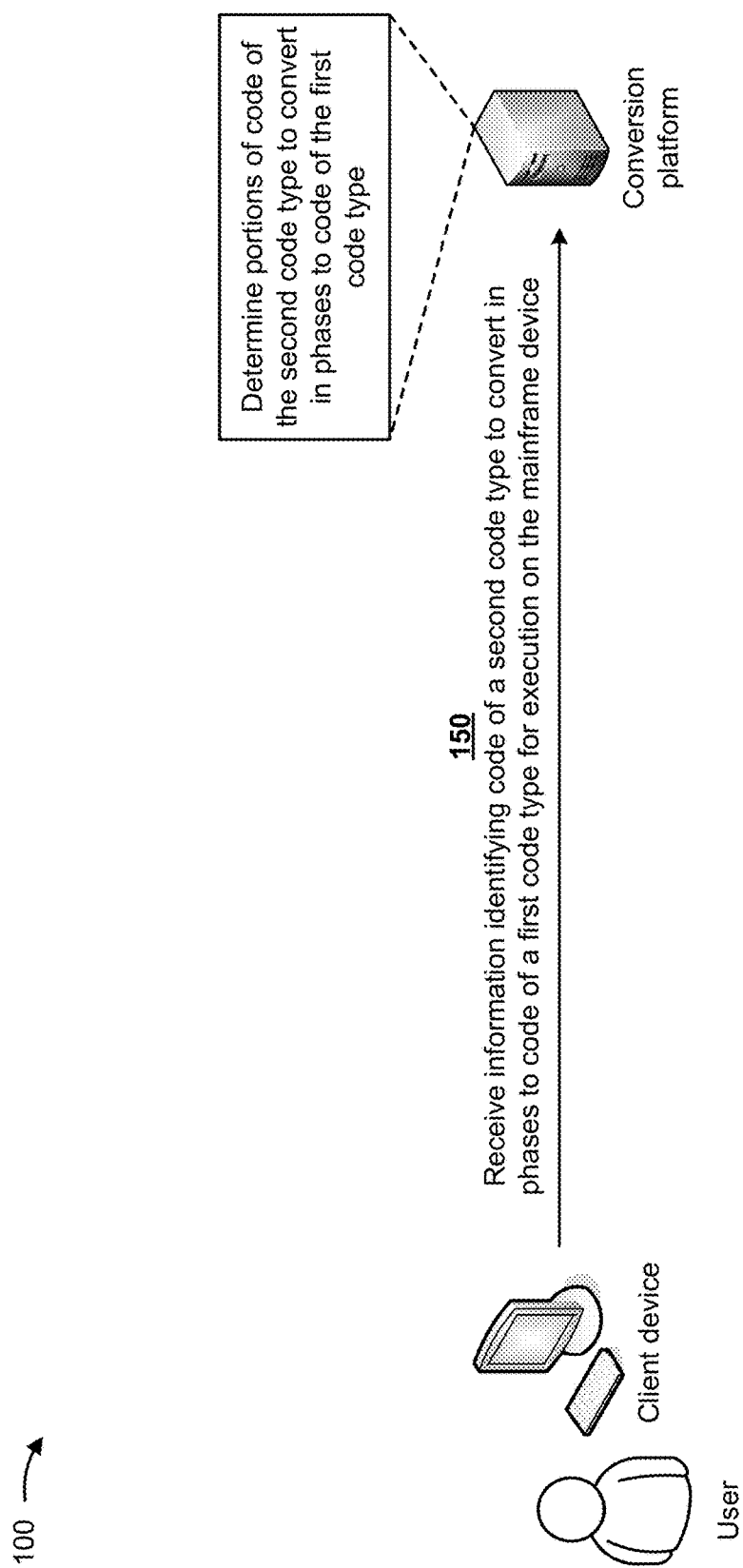

As shown in FIG. 1I, and by reference number 150, the conversion platform may receive, from the client device, information identifying code of a second code type (e.g., a Java code type) and the instruction to convert the code of the second code type to code of a first code type (e.g., a COBOL code type) for execution on the mainframe device. In some implementations, the conversion platform may store the information identifying the code of the second code type in a data structure (e.g., a database, a table, a list, and/or the like) so that the conversion platform may utilize such information later.

As further shown in FIG. 1I, the conversion platform may determine portions of the code of the second code type to convert in phases to the code of the first code type based on the information identifying the code of the second code type. In some implementations, the portions of the code of the second code type may include one or more comments, classes, methods, objects, and/or the like of the code of the second code type. In some implementations, the conversion platform may convert the portions of the code of the second code type in phases to prevent coding errors (e.g., a need to correct such coding errors) associated with converting the entire code of the second code type. In this way, the conversion platform conserves resources (e.g., processing resources, memory resources, and/or the like) that would otherwise be wasted in correcting such coding errors.

Figure 1J:
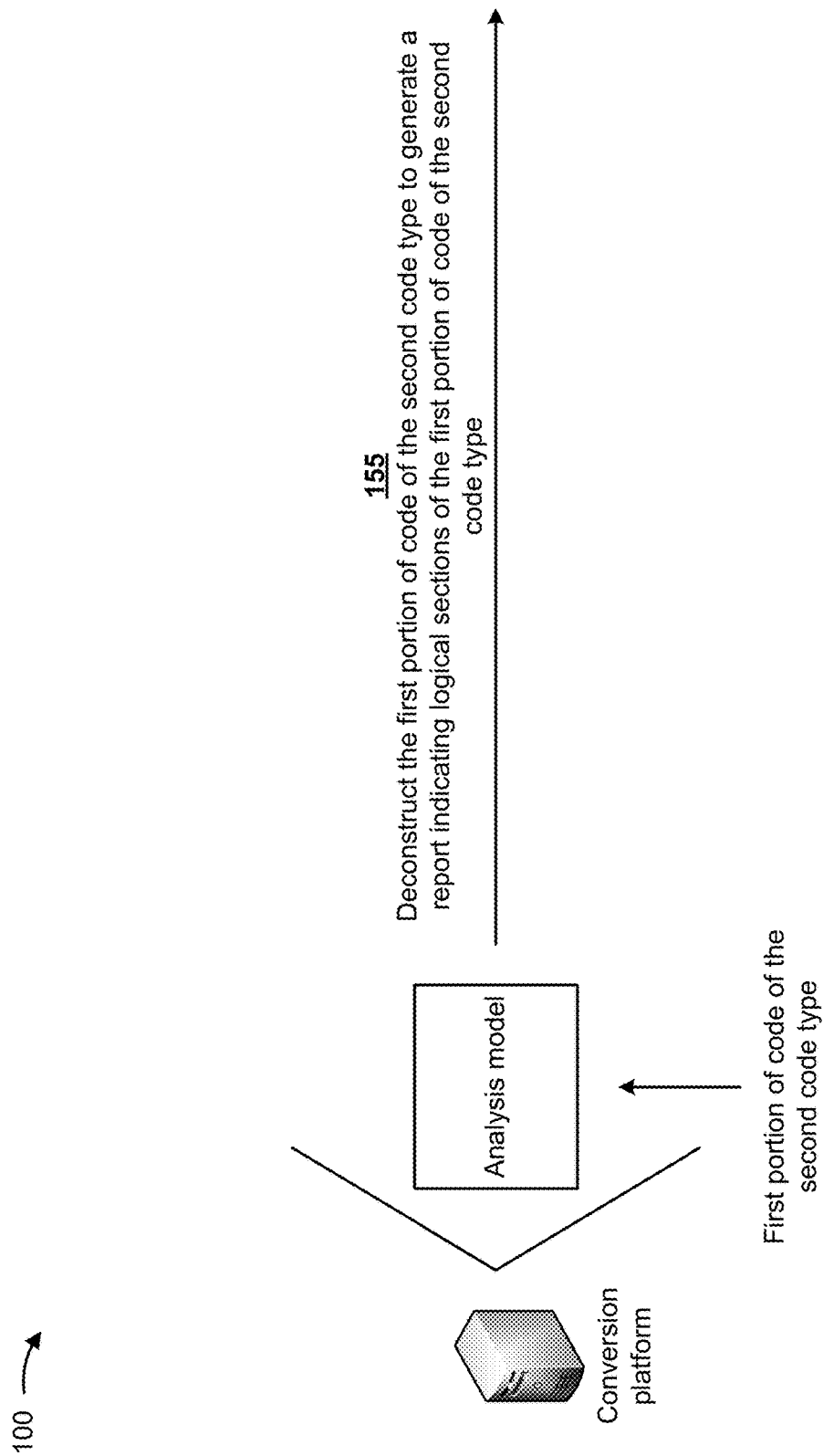

As shown in FIG. 1J, the conversion platform may process a first portion of code of the second code type with an analysis model. In some implementations, the analysis model may include a machine learning model. As further shown in FIG. 1J, and by reference number 155, the conversion platform may process the first portion of code of the second code type, with the analysis model, to deconstruct the first portion of code of the second code type and to generate a report indicating logical sections of the first portion of code of the second code type. In some implementations, the report may present the logical sections in different perspectives to enable logic tracing and analysis of the first portion of code of the second code type, may present a flattened view of program logic associated with the first portion of code of the second code type, and/or the like. In this way, the conversion platform may conserve resources (e.g., processing resources, memory resources, and/or the like) associated with analysis of the first portion of code of the second code type.

In some implementations, the conversion platform may train the analysis model, with historical data, to identify logical sections for code of the second code type. The historical data may include information identifying historical code of the second code type, logical sections of the historical code of the second code type, different perspectives of the logical sections of the historical code of the second code type, flattened views of program logic associated with the historical code of the second code type, and/or the like.

The conversion platform may separate the historical data into a training set, a validation set, a test set, and/or the like. The training set may be utilized to train the analysis model. The validation set may be utilized to validate results of the trained analysis model. The test set may be utilized to test operation of the analysis model. In some implementations, the conversion platform may train the analysis model using, for example, an unsupervised training procedure and based on the historical data. For example, the conversion platform may perform dimensionality reduction to reduce the historical data to a minimum feature set, thereby reducing resources (e.g., processing resources, memory resources, and/or the like) to train the analysis model and may apply a classification technique to the minimum feature set.

In some implementations, the conversion platform may use a logistic regression classification technique to determine a categorical outcome (e.g., a report indicating logical sections of code of the second code type). Additionally, or alternatively, the conversion platform may use a naïve Bayesian classifier technique. In this case, the conversion platform may perform binary recursive partitioning to split the historical data into partitions and/or branches and use the partitions and/or branches to perform predictions (e.g., a report indicating logical sections of code of the second code type). Based on using recursive partitioning, the conversion platform may reduce utilization of computing resources relative to manual, linear sorting and analysis of data points, thereby enabling use of thousands, millions, or billions of data points to train the analysis model, which may result in a more accurate model than using fewer data points.

Additionally, or alternatively, the conversion platform may use a support vector machine (SVM) classifier technique to generate a non-linear boundary between data points in the training set. In this case, the non-linear boundary is used to classify test data into a particular class.

Additionally, or alternatively, the conversion platform may train the analysis model using a supervised training procedure that includes receiving input to the analysis model from a subject matter expert, which may reduce an amount of time, an amount of processing resources, and/or the like to train the analysis model relative to an unsupervised training procedure. In some implementations, the conversion platform may use one or more other model training techniques, such as a neural network technique, a latent semantic indexing technique, and/or the like. For example, the conversion platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained analysis model generated by the conversion platform by being more robust to noisy, imprecise, or incomplete data, and by enabling the conversion platform to detect patterns and/or trends undetectable to human analysts or systems using less complex techniques.

Figure 1K:
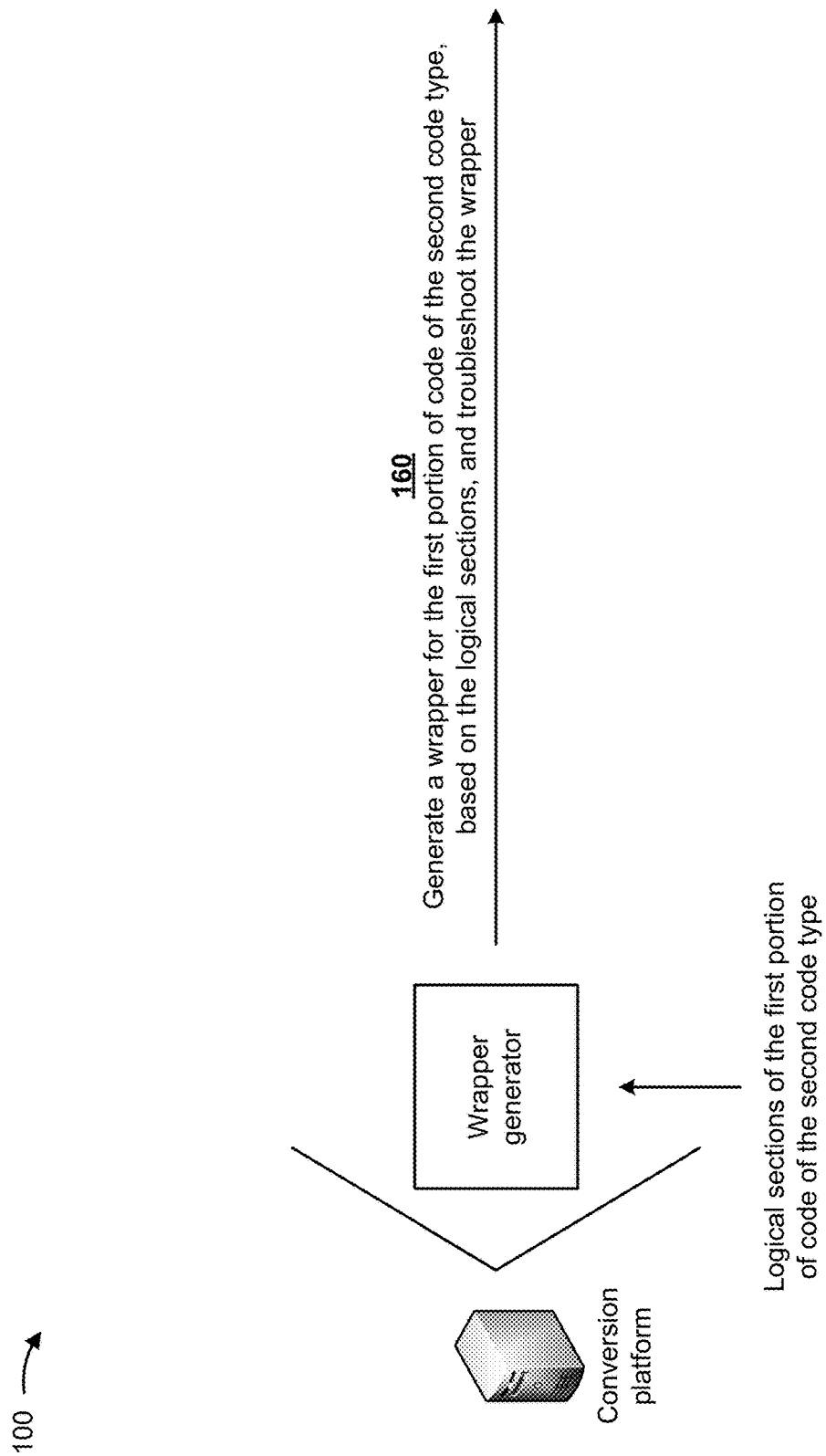

As shown in FIG. 1K, and by reference number 160, the conversion platform may generate a wrapper for the first portion of code of the second code type, based on the logical sections, and may troubleshoot the wrapper. In some implementations, the wrapper may convert data type parameters of the second code type to data type parameters of the first code type. In some implementations, the conversion platform may generate multiple wrappers for the first portion of code of the second code type. In some implementations, the wrapper may pass correct values from code of the second code type to code of the first code type, which may reduce errors associated with converting the code of the second code type to the code of the first code type. In some implementations, the conversion platform may verify that the wrapper passes correct values from code of the second code type to code of the first code type and may troubleshoot when the wrapper does not pass the correct values. In this way, the conversion platform may reduce time and effort associated with wrapper generation and troubleshooting, which may conserve resources (e.g., processing resources, memory resources, and/or the like).

Figure 1L:
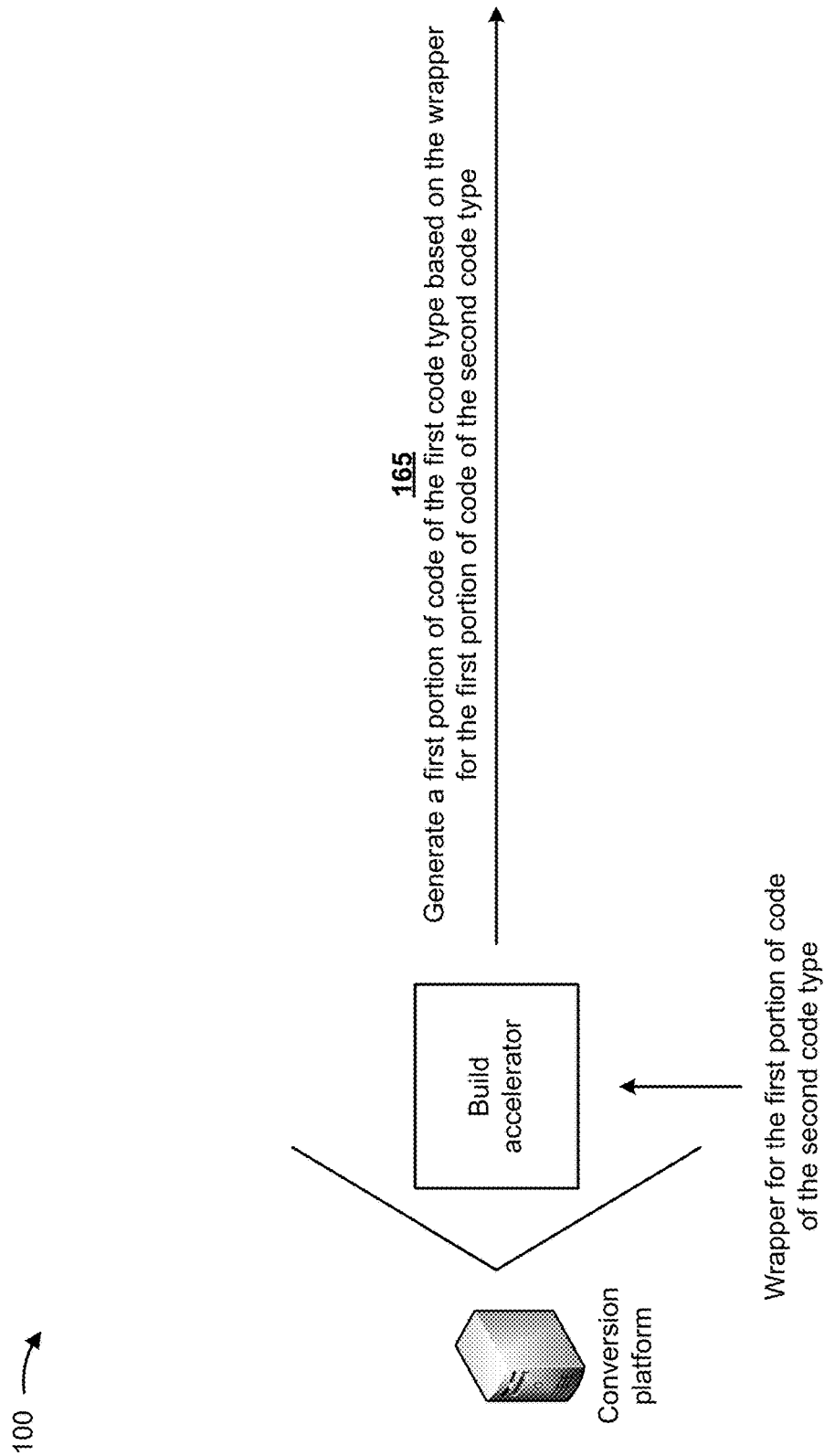

As shown in FIG. 1L, and by reference number 165, the conversion platform may generate a first portion of code of the first code type based on the wrapper for the first portion of code of the second code type. In some implementations, the conversion platform may generate, based on the wrapper, database-related services for the first portion of code of the first code type, such as data transfer object (DTO) services, data access object (DAO) services, data extension services, and/or the like. In some implementations, the conversion platform may generate, based on the wrapper, an online controller (e.g., that may be utilized by the client device) for converting the first portion of code of the second code type to the first portion of code of the first code type. In some implementations, the conversion platform may generate, based on the wrapper, reports identifying code that is automatically created for the first portion of code of the first code type. In this way, the conversion platform may reduce time and effort associated with generating the first portion of code of the first code type, which may conserve resources (e.g., processing resources, memory resources, and/or the like).

Figure 1M:
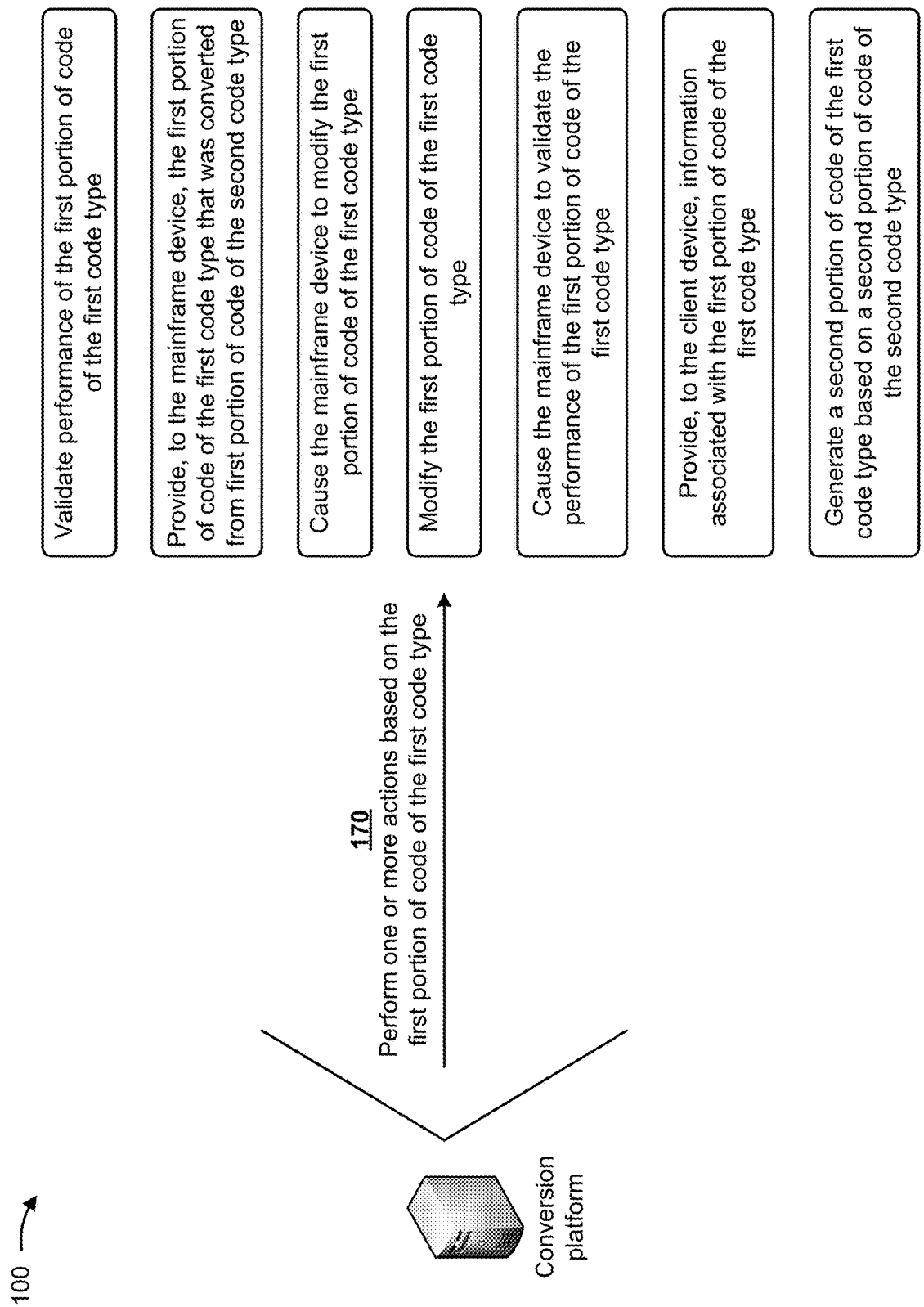

As shown in FIG. 1M, and by reference number 170, the conversion platform may perform one or more actions based on the first portion of code of the first code type. In some implementations, the one or more actions may include validating performance of the first portion of code of the first code type. For example, the conversion platform may execute the first portion of code of the first code type and may validate results of executing the first portion of code of the first code type. In this way, the conversion platform may validate that the first portion of code of the first code type executes correctly.

In some implementations, the one or more actions may include providing, to the mainframe device, the first portion of code of the first code type that was converted from the first portion of code of the second code type. In this way, the conversion platform may convert the code of the second code type in phases to code of the first code type.

In some implementations, the one or more actions may include causing the mainframe device to modify the first portion of code of the first code type. For example, the conversion platform may determine that the first portion of code of the first code type needs a modification to function correctly and may instruct the mainframe device to modify the first portion of code of the first code type accordingly. In this way, the conversion platform may ensure that the first portion of code of the first code type functions correctly.

In some implementations, the one or more actions may include modifying the first portion of code of the first code type. For example, the conversion platform may determine that the first portion of code of the first code type needs a modification to function correctly and may modify the first portion of code of the first code type accordingly. In this way, the conversion platform may ensure that the first portion of code of the first code type functions correctly.

In some implementations, the one or more actions may include causing, the mainframe device, to validate the performance of the first portion of code of the first code type. For example, the conversion platform may instruct the mainframe device to execute the first portion of code of the first code type and to validate results of executing the first portion of code of the first code type. In this way, the mainframe device may validate that the first portion of code of the first code type executes correctly.

In some implementations, the one or more actions may include providing, to the client device, information associated with the first portion of code of the first code type. For example, the conversion platform may provide, to the client device, a user interface that includes the first portion of code of the first code type, errors experienced during execution of the first portion of code of the first code type, and/or the like. In this way, the conversion platform may enable the user of the client device to view the first portion of code of the first code type, correct the errors experienced during execution of the first portion of code of the first code type, and/or the like.

In some implementations, the one or more actions may include generating a second portion of code of the first code type based on a second portion of code of the second code type. In this way, the conversion platform may convert the code of the second code type in phases to code of the first code type.

In this way, several different stages of the process for converting code of a first code type on a mainframe device in phases to code of a second code type are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that converts code of a first code type on a mainframe device in phases to code of a second code type. Finally, automating the process for converting code of a first code type on a mainframe device in phases to code of a second code type, conserves computing resources (e.g., processing resources, memory resources, and/or the like) that would otherwise be wasted in attempting to convert the entire code of the first code type on the mainframe device at one time.

As indicated above, FIGS. 1A-1M are provided merely as examples. Other examples may differ from what was described with regard to FIGS. 1A-1M.

Figure 2:
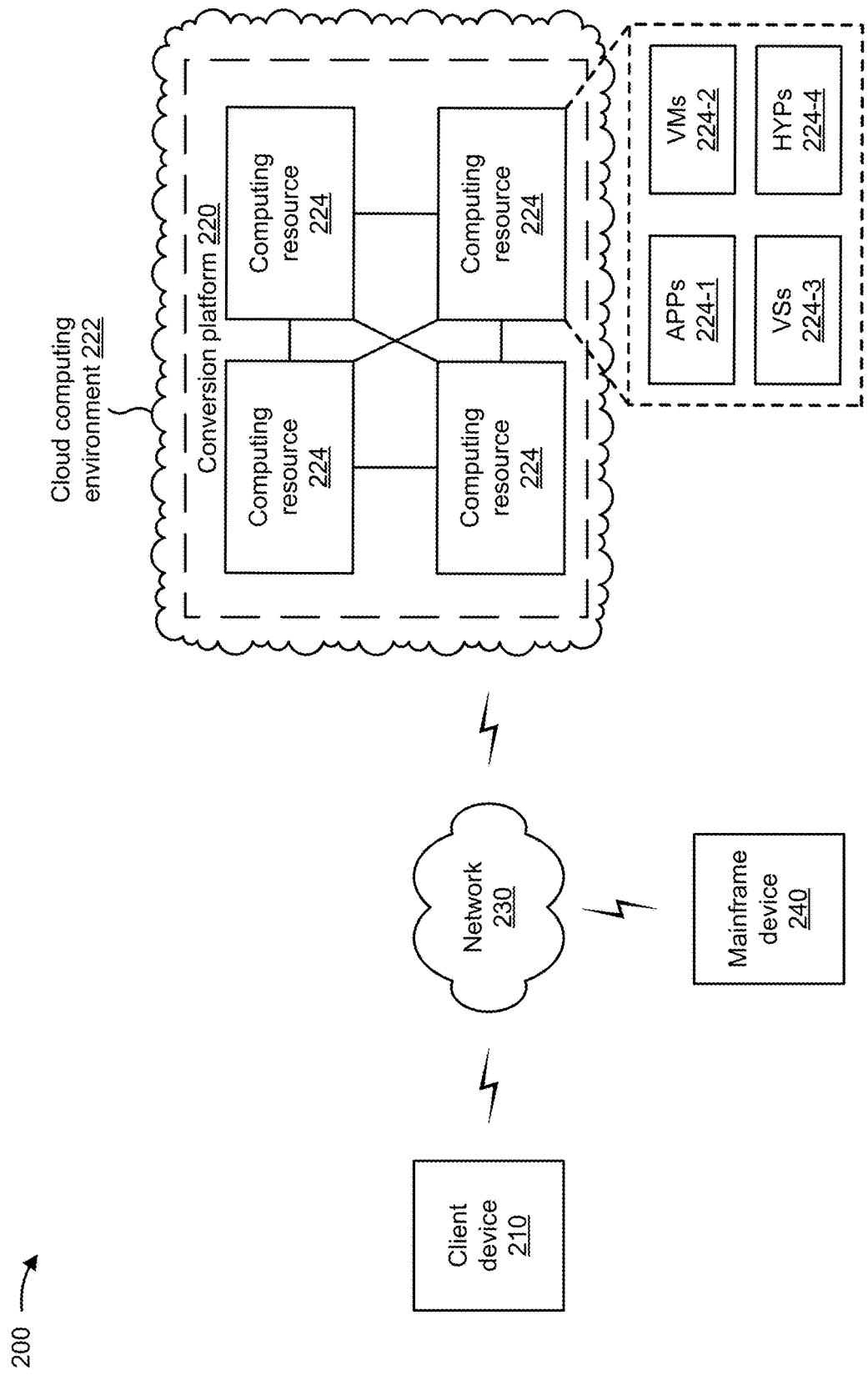
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a conversion platform 220, a network 230, and a mainframe device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to conversion platform 220 and/or mainframe device 240.

Conversion platform 220 includes one or more devices that convert code of a first code type on mainframe device 240 in phases to code of a second code type. In some implementations, conversion platform 220 may be designed to be modular such that certain software components may be swapped in or out depending on a particular need. As such, conversion platform 220 may be easily and/or quickly reconfigured for different uses. In some implementations, conversion platform 220 may receive information from and/or transmit information to one or more client devices 210 and/or mainframe devices 240.

In some implementations, as shown, conversion platform 220 may be hosted in a cloud computing environment 222. Notably, while implementations described herein describe conversion platform 220 as being hosted in cloud computing environment 222, in some implementations, conversion platform 220 may not be cloud-based (i.e., may be implemented outside of a cloud computing environment) or may be partially cloud-based.

Cloud computing environment 222 includes an environment that hosts conversion platform 220. Cloud computing environment 222 may provide computation, software, data access, storage, etc. services that do not require end-user knowledge of a physical location and configuration of system(s) and/or device(s) that hosts conversion platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host conversion platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with conversion platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or mainframe device 240 or an operator of conversion platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Mainframe device 240 includes one or more devices capable of receiving, generating, storing, processing, and/or providing information, such as information described herein. For example, mainframe device 240 may include a mainframe computer, a group of mainframe computers, a device characterized by redundant internal engineering resulting in high reliability and security and extensive input-output facilities with the ability to offload to separate engines, or a similar type of device, which utilizes a first code type. In some implementations, mainframe device 240 may convert a first code type on mainframe device 240 in phases to a second code type.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
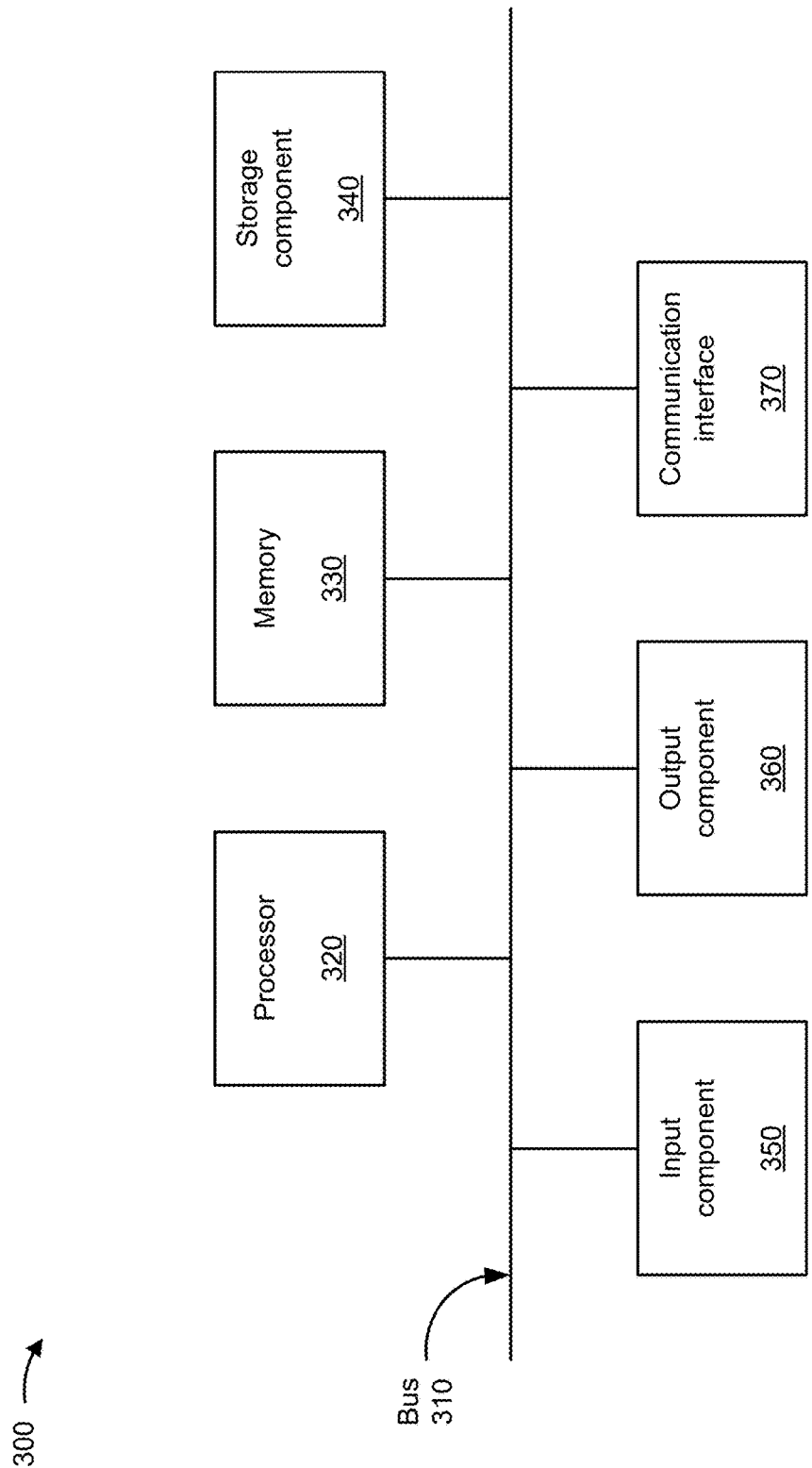
FIG. 3 is a diagram of example components of one or more devices of FIG. 2.

FIG. 3 is a diagram of example components of a device 300. Device 300 may correspond to client device 210, conversion platform 220, and/or computing resource 224. In some implementations, client device 210, conversion platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
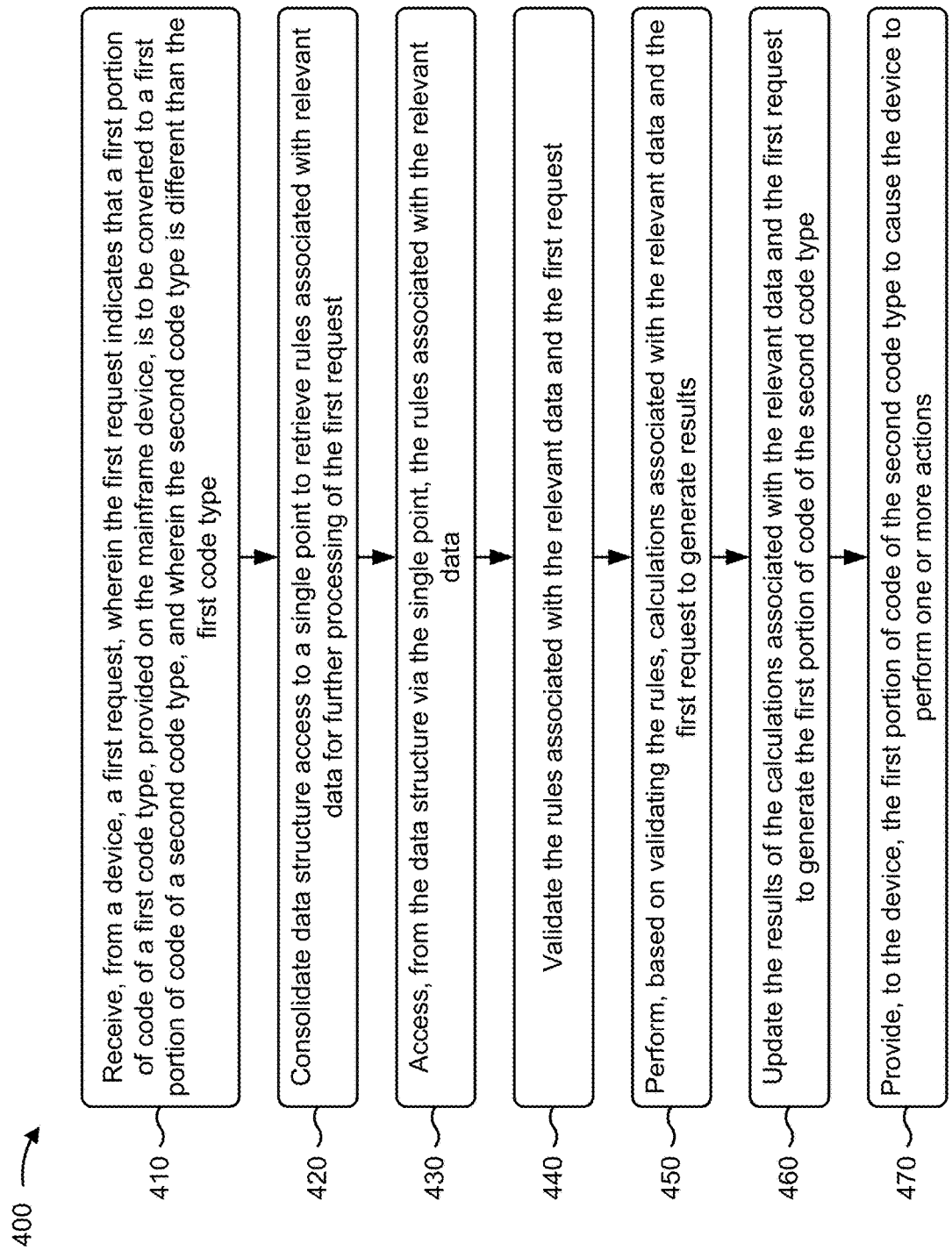
FIGS. 4-6 are flow charts of example processes for converting code of a first code type on a mainframe device in phases to code of a second code type.

FIG. 4 is a flow chart of an example process 400 for converting code of a first code type on a mainframe device in phases to code of a second code type. In some implementations, one or more process blocks of FIG. 4 may be performed by a mainframe device (e.g., mainframe device 240). In some implementations, one or more process blocks of FIG. 4 may be performed by another device or a group of devices separate from or including the mainframe device, such as a client device (e.g., client device 210) and/or a conversion platform (e.g., conversion platform 220).

As shown in FIG. 4, process 400 may include receiving, by a mainframe device and from a device, a first request, wherein the first request indicates that a first portion of code of a first code type, provided on the mainframe device, is to be converted to a first portion of code of a second code type, and wherein the second code type is different than the first code type (block 410). For example, the mainframe device (e.g., using processor 320, communication interface 370, and/or the like) may receive, from a device, a first request, as described above in connection with FIGS. 1A-2. In some implementations, the first request may indicate that a first portion of code of a first code type, provided on the mainframe device, is to be converted to a first portion of code of a second code type, and the second code type is different than the first code type.

As further shown in FIG. 4, process 400 may include consolidating, by the mainframe device, data structure access to a single point to retrieve rules associated with relevant data for further processing of the first request (block 420). For example, the mainframe device (e.g., using processor 320, memory 330, communication interface 370, and/or the like) may consolidate data structure access to a single point to retrieve rules associated with relevant data for further processing of the first request, as described above in connection with FIGS. 1A-2.

As further shown in FIG. 4, process 400 may include accessing, by the mainframe device and from the data structure via the single point, the rules associated with the relevant data (block 430). For example, the mainframe device (e.g., using processor 320, storage component 340, communication interface 370, and/or the like) may access, from the data structure via the single point, the rules associated with the relevant data, as described above in connection with FIGS. 1A-2.

As further shown in FIG. 4, process 400 may include validating, by the mainframe device, the rules associated with the relevant data and the first request (block 440). For example, the mainframe device (e.g., using processor 320, memory 330, and/or the like) may validate the rules associated with the relevant data and the first request, as described above in connection with FIGS. 1A-2.

As further shown in FIG. 4, process 400 may include performing, by the mainframe device and based on validating the rules, calculations associated with the relevant data and the first request to generate results (block 450). For example, the mainframe device (e.g., using processor 320, storage component 340, and/or the like) may perform, based on validating the rules, calculations associated with the relevant data and the first request to generate results, as described above in connection with FIGS. 1A-2.

As further shown in FIG. 4, process 400 may include updating, by the mainframe device, the results of the calculations associated with the relevant data and the first request to generate the first portion of code of the second code type (block 460). For example, the mainframe device (e.g., using processor 320, memory 330, and/or the like) may update the results of the calculations associated with the relevant data and the first request to generate the first portion of code of the second code type, as described above in connection with FIGS. 1A-2.

As further shown in FIG. 4, process 400 may include providing, by the mainframe device and to the device, the first portion of code of the second code type to cause the device to perform one or more actions (block 470). For example, the mainframe device (e.g., using processor 320, storage component 340, communication interface 370, and/or the like) may provide, to the device, the first portion of code of the second code type to cause the device to perform one or more actions, as described above in connection with FIGS. 1A-2.

Process 400 may include additional implementations, such as any single implementation or any combination of implementations described below and/or described with regard to any other process described herein.

In some implementations, the mainframe device may validate the first request before performing the calculations, where the performing occurs based on the first request being successfully validated. In some implementations, the one or more actions may include validating performance of the first portion of code of the second code type; providing, to the mainframe device, a second request indicating a second portion of code of the first code type to convert to a second portion of code of the second code type; causing the mainframe device to modify the first portion of code of the second code type; modifying the first portion of code of the second code type; providing, to the mainframe device, information indicating an issue associated with the first portion of code of the second code type; and/or providing, to a client device, information associated with the first portion of code of the second code type.

In some implementations, the mainframe device may receive, from the device, a second request, where the second request indicates that a second portion of code of the first code type, provided on the mainframe device, is to be converted to a second portion of code of the second code type, and may generate the second portion of code of the second code type based on the second request and based on the second portion of code of the first code type. In some implementations, the first code type may include a common business-oriented language (COBOL) language type, and the second code type may include a Java language type.

In some implementations, the mainframe device may provide, to a client device, information indicating the first code type on the mainframe device, where the client device is to provide, to the device, information indicating the first code type on the mainframe device to convert in phases to the second code type, and where receiving the first request includes receiving the first request based on providing, to the client device, the information indicating the first code type on the mainframe device. In some implementations, the first code type may be converted in phases to the second code type.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
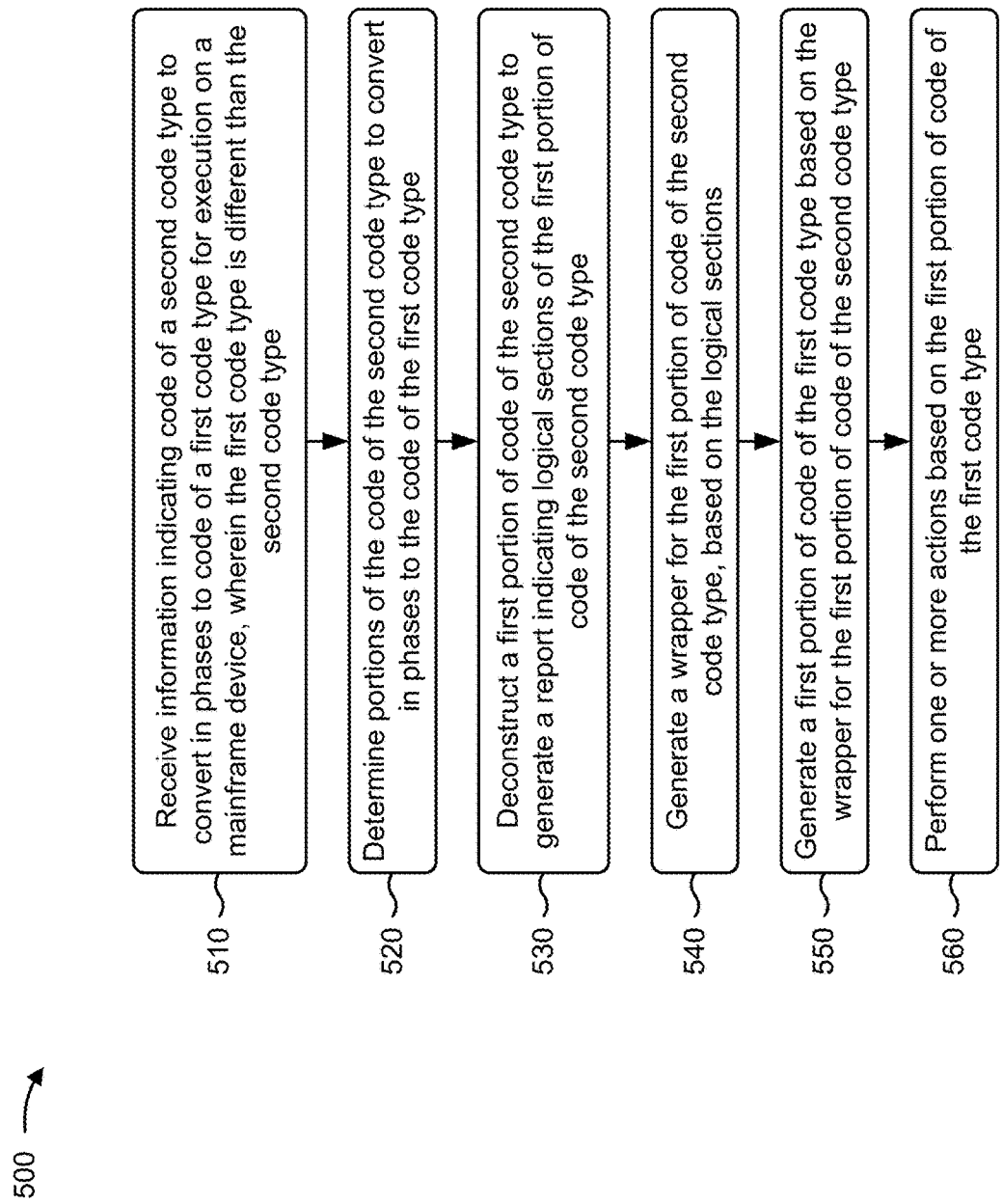

FIG. 5 is a flow chart of an example process 500 for converting code of a first code type on a mainframe device in phases to code of a second code type. In some implementations, one or more process blocks of FIG. 5 may be performed by a conversion platform (e.g., conversion platform 220). In some implementations, one or more process blocks of FIG. 5 may be performed by another device or a group of devices separate from or including the conversion platform, such as a client device (e.g., client device 210) and/or a mainframe device (e.g., mainframe device 240).

As shown in FIG. 5, process 500 may include receiving information indicating code of a second code type to convert in phases to code of a first code type for execution on a mainframe device, wherein the first code type is different than the second code type (block 510). For example, the conversion platform (e.g., using computing resource 224, processor 320, communication interface 370, and/or the like) may receive information indicating code of a second code type to convert in phases to code of a first code type for execution on a mainframe device, as described above in connection with FIGS. 1A-2. In some implementations, the first code type may be different than the second code type.

As further shown in FIG. 5, process 500 may include determining portions of the code of the second code type to convert in phases to the code of the first code type (block 520). For example, the conversion platform (e.g., using computing resource 224, processor 320, storage component 340, and/or the like) may determine portions of the code of the second code type to convert in phases to the code of the first code type, as described above in connection with FIGS. 1A-2.

As further shown in FIG. 5, process 500 may include deconstructing a first portion of code of the second code type to generate a report indicating logical sections of the first portion of code of the second code type (block 530). For example, the conversion platform (e.g., using computing resource 224, processor 320, memory 330, and/or the like) may deconstruct a first portion of code of the second code type to generate a report indicating logical sections of the first portion of code of the second code type, as described above in connection with FIGS. 1A-2.

As further shown in FIG. 5, process 500 may include generating a wrapper for the first portion of code of the second code type, based on the logical sections (block 540).

For example, the conversion platform (e.g., using computing resource 224, processor 320, memory 330, storage component 340, and/or the like) may generate a wrapper for the first portion of code of the second code type, based on the logical sections, as described above in connection with FIGS. 1A-2.

As further shown in FIG. 5, process 500 may include generating a first portion of code of the first code type based on the wrapper for the first portion of code of the second code type (block 550). For example, the conversion platform (e.g., using computing resource 224, processor 320, storage component 340, and/or the like) may generate a first portion of code of the first code type based on the wrapper for the first portion of code of the second code type, as described above in connection with FIGS. 1A-2.

As further shown in FIG. 5, process 500 may include performing one or more actions based on the first portion of code of the first code type (block 560). For example, the conversion platform (e.g., using computing resource 224, processor 320, memory 330, storage component 340, input component 350, output component 360, communication interface 370, and/or the like) may perform one or more actions based on the first portion of code of the first code type, as described above in connection with FIGS. 1A-2.

Process 500 may include additional implementations, such as any single implementation or any combination of implementations described below and/or described with regard to any other process described herein.

In some implementations, the conversion platform may troubleshoot the wrapper for the first portion of code of the second code type. In some implementations, when performing the one or more actions, the conversion platform may validate performance of the first portion of code of the first code type; may provide, to the mainframe device, the first portion of code of the first code type that was converted from the first portion of code of the second code type; may cause the mainframe device to modify the first portion of code of the first code type; may modify the first portion of code of the first code type; may cause the mainframe device to validate the performance of the first portion of code of the first code type; may provide, to a client device, information associated with the first portion of code of the first code type; and/or may generate a second portion of code of the first code type based on a second portion of code of the second code type.

In some implementations, the conversion platform may generate subsequent portions of code of the first code type based on subsequent portions of code of the second code type. In some implementations, the first code type may include a common business-oriented language (COBOL) language type, and the second code type may include a Java language type.

In some implementations, the conversion platform may cause the first portion of code of the first code type to be executed on the mainframe device and may validate performance of the first portion of code of the first code type based on causing the first portion of code of the first code type to be executed on the mainframe device. In some implementations, the second code type may be converted in phases to the first code type.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
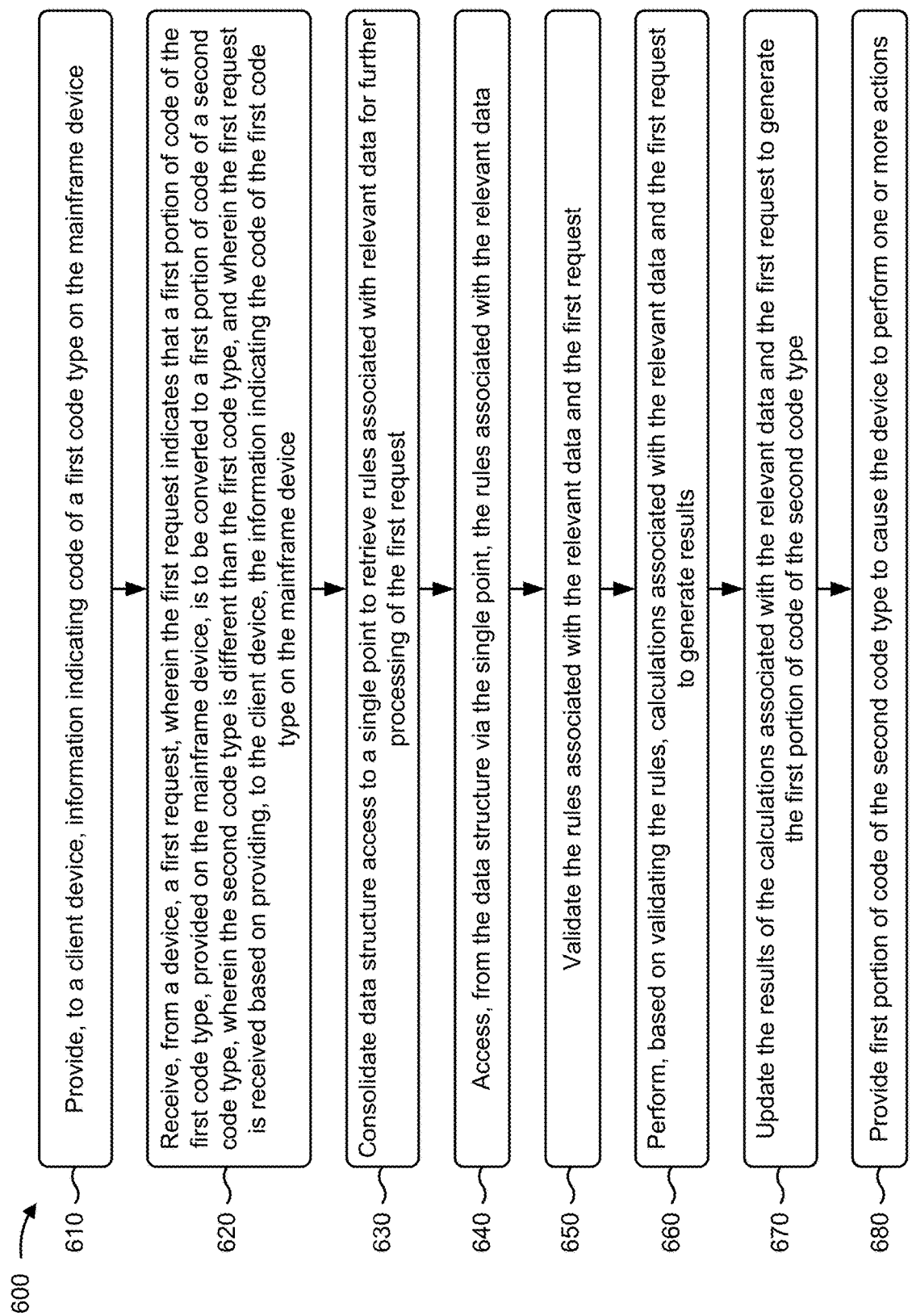

FIG. 6 is a flow chart of an example process 600 for converting code of a first code type on a mainframe device in phases to code of a second code type. In some implementations, one or more process blocks of FIG. 6 may be performed by a mainframe device (e.g., mainframe device 240). In some implementations, one or more process blocks of FIG. 6 may be performed by another device or a group of devices separate from or including the mainframe device, such as a client device (e.g., client device 210) and/or a conversion platform (e.g., conversion platform 220).

As shown in FIG. 6, process 600 may include providing, to a client device, information indicating code of a first code type on the mainframe device (block 610). For example, the mainframe device (e.g., processor 320, communication interface 370, and/or the like) may provide, to a client device, information indicating code of a first code type on the mainframe device, as described above in connection with FIGS. 1A-2.

As further shown in FIG. 6, process 600 may include receiving, from a device, a first request, wherein the first request indicates that a first portion of code of the first code type, provided on the mainframe device, is to be converted to a first portion of code of a second code type, wherein the second code type is different than the first code type, and wherein the first request is received based on providing, to the client device, the information indicating the code of the first code type on the mainframe device (block 620). For example, the mainframe device (e.g., using processor 320, communication interface 370, and/or the like) may receive, from a device, a first request, as described above in connection with FIGS. 1A-2. In some implementations, the first request indicates that a first portion of code of the first code type, provided on the mainframe device, is to be converted to a first portion of code of a second code type, the second code type is different than the first code type, and the first request is received based on providing, to the client device, the information indicating the code of the first code type on the mainframe device.

As further shown in FIG. 6, process 600 may include consolidating data structure access to a single point to retrieve rules associated with relevant data for further processing of the first request (block 630). For example, the mainframe device (e.g., using processor 320, storage component 340, communication interface 370, and/or the like) may consolidate data structure access to a single point to retrieve rules associated with relevant data for further processing of the first request, as described above in connection with FIGS. 1A-2.

As further shown in FIG. 6, process 600 may include accessing, from the data structure via the single point, the rules associated with the relevant data (block 640). For example, the mainframe device (e.g., using processor 320, memory 330, communication interface 370, and/or the like) may access, from the data structure via the single point, the rules associated with the relevant data, as described above in connection with FIGS. 1A-2.

As further shown in FIG. 6, process 600 may include validating the rules associated with the relevant data and the first request (block 650). For example, the mainframe device (e.g., using processor 320, memory 330, storage component 340, and/or the like) may validate the rules associated with the relevant data and the first request, as described above in connection with FIGS. 1A-2.

As further shown in FIG. 6, process 600 may include performing, based on validating the rules, calculations associated with the relevant data and the first request to generate results (block 660). For example, the mainframe device (e.g., using processor 320, memory 330, and/or the like) may perform, based on validating the rules, calculations associated with the relevant data and the first request to generate results, as described above in connection with FIGS. 1A-2.

As further shown in FIG. 6, process 600 may include updating the results of the calculations associated with the relevant data and the first request to generate the first portion of code of the second code type (block 670). For example, the mainframe device (e.g., using processor 320, storage component 340, and/or the like) may update the results of the calculations associated with the relevant data and the first request to generate the first portion of code of the second code type, as described above in connection with FIGS. 1A-2.

As further shown in FIG. 6, process 600 may include providing, to the device, the first portion of code of the second code type to cause the device to perform one or more actions (block 680). For example, the mainframe device (e.g., using processor 320, communication interface 370, and/or the like) may provide, to the device, the first portion of code of the second code type to cause the device to perform one or more actions, as described above in connection with FIGS. 1A-2.

Process 600 may include additional implementations, such as any single implementation or any combination of implementations described below and/or described with regard to any other process described herein.

In some implementations, the mainframe device may validate the first request before performing the calculations, where the performing occurs based on the first request being successfully validated. In some implementations, the one or more actions may include validating performance of the first portion of code of the second code type; providing, to the mainframe device, a second request indicating a second portion of code of the first code type to convert to a second portion of code of the second code type; causing the mainframe device to modify the first portion of code of the second code type; modifying the first portion of code of the second code type; providing, to the mainframe device, information indicating an issue associated with the first portion of code of the second code type; and/or providing, to the client device, information associated with the first portion of code of the second code type.

In some implementations, the mainframe device may receive, from the device, a second request indicating a second portion of code of the first code type to convert to a second portion of code of the second code type, and may generate the second portion of code of the second code type based on the second request and based on the second portion of code of the first code type. In some implementations, the first code type may include a common business-oriented language (COBOL) language type, and the second code type may include a Java language type. In some implementations, the first code type may be converted in phases to the second code type.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a mainframe device and from a device, a first request,
      wherein the first request indicates that a first portion of code of a first code type, provided on the mainframe device, is to be converted to a first portion of code of a second code type,
         wherein the second code type is different than the first code type;

consolidating, by the mainframe device, data structure access to a single point to retrieve rules associated with relevant data for further processing of the first request;

accessing, by the mainframe device and from the data structure via the single point, the rules associated with the relevant data;

validating, by the mainframe device, the rules associated with the relevant data and the first request;

performing, by the mainframe device and based on validating the rules, calculations associated with the relevant data and the first request to generate results;

updating, by the mainframe device, the results of the calculations associated with the relevant data and the first request to generate the first portion of code of the second code type; and providing, by the mainframe device and to the device, the first portion of code of the second code type to cause the device to perform one or more actions.

2. The method of claim 1, further comprising:
validating the first request before performing the calculations,
wherein the performing occurs based on the first request being successfully validated.

3. The method of claim 1, wherein the one or more actions comprise one or more of:
validating performance of the first portion of code of the second code type;
providing, to the mainframe device, a second request indicating a second portion of code of the first code type to convert to a second portion of code of the second code type;
causing the mainframe device to modify the first portion of code of the second code type;
modifying the first portion of code of the second code type;
providing, to the mainframe device, information indicating an issue associated with the first portion of code of the second code type; or
providing, to a client device, information associated with the first portion of code of the second code type.

4. The method of claim 1, further comprising:
receiving, from the device, a second request,
wherein the second request indicates that a second portion of code of the first code type, provided on the mainframe device, is to be converted to a second portion of code of the second code type; and
generating the second portion of code of the second code type based on the second request and based on the second portion of code of the first code type.

5. The method of claim 1, wherein:
the first code type includes a common business-oriented language (COBOL) language type, and
the second code type includes a Java language type.

6. The method of claim 1, further comprising:
providing, to a client device, information indicating the first code type on the mainframe device,
wherein the client device is to provide, to the device, information indicating the first code type on the mainframe device to convert in phases to the second code type; and
wherein receiving the first request includes:
receiving the first request based on providing, to the client device, the information indicating the first code type on the mainframe device.

7. The method of claim 1, wherein the first code type is converted in phases to the second code type.

8. A device, comprising:
one or more memories; and
one or more processors, communicatively coupled to the one or more memories, to:
receive information indicating code of a second code type to convert in phases to code of a first code type for execution on a mainframe device,
wherein the first code type is different than the second code type;
determine portions of the code of the second code type to convert in phases to the code of the first code type;
deconstruct a first portion of code of the second code type to generate a report indicating logical sections of the first portion of code of the second code type;
generate a wrapper for the first portion of code of the second code type, based on the logical sections;
generate a first portion of code of the first code type based on the wrapper for the first portion of code of the second code type; and
perform one or more actions based on the first portion of code of the first code type.

9. The device of claim 8, wherein the one or more processors are further to:
troubleshoot the wrapper for the first portion of code of the second code type.

10. The device of claim 8, wherein, when performing the one or more actions, the one or more processors are to one or more of:
validate performance of the first portion of code of the first code type;
provide, to the mainframe device, the first portion of code of the first code type that was converted from the first portion of code of the second code type;
cause the mainframe device to modify the first portion of code of the first code type;
modify the first portion of code of the first code type;
cause the mainframe device to validate the performance of the first portion of code of the first code type;
provide, to a client device, information associated with the first portion of code of the first code type; or
generate a second portion of code of the first code type based on a second portion of code of the second code type.

11. The device of claim 8, wherein the one or more processors are further to:
generate subsequent portions of code of the first code type based on subsequent portions of code of the second code type.

12. The device of claim 8, wherein:
the first code type includes a common business-oriented language (COBOL) language type, and
the second code type includes a Java language type.

13. The device of claim 8, wherein the one or more processors are further to:
cause the first portion of code of the first code type to be executed on the mainframe device; and
validate performance of the first portion of code of the first code type based on causing the first portion of code of the first code type to be executed on the mainframe device.

14. The device of claim 8, wherein the second code type is converted in phases to the first code type.

15. A non-transitory computer-readable medium storing instructions, the instructions comprising:
one or more instructions that, when executed by one or more processors of a mainframe device, cause the one or more processors to:

provide, to a client device, information indicating code
   of a first code type on the mainframe device;
receive, from a device, a first request,
   wherein the first request indicates that a first portion
      of code of the first code type, provided on the
      mainframe device, is to be converted to a first
      portion of code of a second code type,
      wherein the second code type is different than the
         first code type, and
   wherein the first request is received based on pro-
      viding, to the client device, the information indi-
      cating the code of the first code type on the
      mainframe device;
consolidate data structure access to a single point to
   retrieve rules associated with relevant data for fur-
   ther processing of the first request;
access, from the data structure via the single point, the
   rules associated with the relevant data;
validate the rules associated with the relevant data and
   the first request;
perform, based on validating the rules, calculations
   associated with the relevant data and the first request
   to generate results;
update the results of the calculations associated with
   the relevant data and the first request to generate the
   first portion of code of the second code type; and
provide, to the device, the first portion of code of the
   second code type to cause the device to perform one
   or more actions.

16. The non-transitory computer-readable medium of claim 15, wherein the instructions further comprise:
one or more instructions that, when executed by the one or more processors, cause the one or more processors to:
   validate the first request before performing the calcu-
      lations,
      wherein the performing occurs based on the first
         request being successfully validated.

17. The non-transitory computer-readable medium of claim 15, wherein the one or more actions comprise one or more of:
   validating performance of the first portion of code of the
      second code type;
   providing, to the mainframe device, a second request
      indicating a second portion of code of the first code
      type to convert to a second portion of code of the
      second code type;
   causing the mainframe device to modify the first portion
      of code of the second code type;
   modifying the first portion of code of the second code
      type;
   providing, to the mainframe device, information indicat-
      ing an issue associated with the first portion of code of
      the second code type; or
   providing, to the client device, information associated
      with the first portion of code of the second code type.

18. The non-transitory computer-readable medium of claim 15, wherein the instructions further comprise:
one or more instructions that, when executed by the one or more processors, cause the one or more processors to:
   receive, from the device, a second request indicating a
      second portion of code of the first code type to
      convert to a second portion of code of the second
      code type; and
   generate the second portion of code of the second code
      type based on the second request and based on the
      second portion of code of the first code type.

19. The non-transitory computer-readable medium of claim 15, wherein:
the first code type includes a common business-oriented
   language (COBOL) language type, and
the second code type includes a Java language type.

20. The non-transitory computer-readable medium of claim 15, wherein the first code type is converted in phases to the second code type.

* * * * *